United States Patent
Ohara

(10) Patent No.: US 8,989,218 B2
(45) Date of Patent: *Mar. 24, 2015

(54) SYSTEM, DEVICE, METHOD AND COMPUTER PROGRAM PRODUCT FOR MANAGING DEVICES

(71) Applicant: Kiyotaka Ohara, Nagoya (JP)

(72) Inventor: Kiyotaka Ohara, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/075,184

(22) Filed: Nov. 8, 2013

(65) Prior Publication Data

US 2014/0068093 A1 Mar. 6, 2014

Related U.S. Application Data

(63) Continuation of application No. 13/245,213, filed on Sep. 26, 2011, now Pat. No. 8,619,810, which is a continuation of application No. 11/237,864, filed on Sep. 29, 2005, now Pat. No. 8,085,788.

(30) Foreign Application Priority Data

Sep. 30, 2004 (JP) ................................. 2004-289134

(51) Int. Cl.
*H04J 3/16* (2006.01)
*H04L 29/06* (2006.01)
*H04L 12/24* (2006.01)

(52) U.S. Cl.
CPC .......... *H04L 65/1069* (2013.01); *H04L 41/082* (2013.01); *H04L 41/0869* (2013.01); *H04L 41/0873* (2013.01); *H04L 69/18* (2013.01); *H04L 41/0226* (2013.01); *H04L 69/16* (2013.01)

USPC .......................................................... 370/469

(58) Field of Classification Search
CPC ..... G06Q 20/20; G06Q 20/322; G06Q 40/00; H04L 45/7453; H04W 12/06
See application file for complete search history.

(56) References Cited

U.S. PATENT DOCUMENTS 5,787,248 A 7/1998 Zupcsics et al.
5,850,539 A 12/1998 Cook et al.
(Continued)

FOREIGN PATENT DOCUMENTS

JP 2000-183874 A 6/2000
JP 2000-270040 A 9/2000
(Continued)

OTHER PUBLICATIONS

European Search Report dated Dec. 15, 2005 in Application No. EP05256153.7.
(Continued)

*Primary Examiner* — Yong Zhou
(74) *Attorney, Agent, or Firm* — Banner & Witcoff, Ltd.

(57) ABSTRACT

A system for managing a communication device having a first function of using a first communication protocol and a second function of using a second communication protocol is provided. The communication device is connected to a network including a first device using the first communication protocol and a second device using the second communication protocol. The system is provided with an inputting system that accepts an input for changing an operation regarding the communication of the communication device from a user, and a judging system that judges whether a trouble would arise in communication, in which the communication device is involved, based on the input inputted by the user through use of the inputting system.

9 Claims, 15 Drawing Sheets

(56) References Cited

U.S. PATENT DOCUMENTS

| | | | |
|---|---|---|---|
| 5,889,954 A * | 3/1999 | Gessel et al. | 709/223 |
| 5,903,716 A | 5/1999 | Kimber et al. | |
| 6,118,484 A | 9/2000 | Yokota et al. | |
| 6,118,784 A | 9/2000 | Tsuchiya et al. | |
| 7,340,520 B1 | 3/2008 | Jordan et al. | |
| 2002/0194259 A1 | 12/2002 | Flykt et al. | |
| 2003/0212892 A1 | 11/2003 | Oishi | |
| 2004/0003089 A1 * | 1/2004 | Chiu | 709/227 |
| 2004/0015521 A1 | 1/2004 | Hudicka | |
| 2004/0111494 A1 | 6/2004 | Kostic et al. | |
| 2004/0162909 A1 | 8/2004 | Choe et al. | |
| 2004/0192301 A1 * | 9/2004 | Shi | 455/435.1 |
| 2004/0199666 A1 | 10/2004 | King et al. | |
| 2005/0021868 A1 * | 1/2005 | Sharma et al. | 709/249 |

FOREIGN PATENT DOCUMENTS

| | | |
|---|---|---|
| JP | 2000-349813 A | 12/2000 |
| JP | 2001-034434 A | 2/2001 |
| JP | 2002-016635 A | 1/2002 |
| JP | 2002-368743 A | 12/2002 |
| JP | 2004-032114 A | 1/2004 |
| JP | 2004-032699 A | 1/2004 |
| JP | 2005-006235 A | 1/2005 |
| JP | 2005-333546 A | 12/2005 |
| JP | 2006-092378 A | 4/2006 |

OTHER PUBLICATIONS

Munechika Sumikawa, Road to Introduction of IPv6—Preparing for the Next Generation: Migration Method for IPv4 to IPv6 (Step 1); Nikkei Network, issued Nov. 22, 2000, No. 8, pp. 186-189.

Notification of Reasons of Rejection dispatched Feb. 9, 2010 in Japanese Application No. 2007-217989.

Notification of Reasons of Rejection dispatched Jun. 26, 2007 in Japanese Application No. 2004-289134.

JP Notifications of Reasons of Rejection darted Jul. 31, 2012, recieved in corresponding JP Application No.: 2010-090377.

* cited by examiner

FIG.3A (ACCESS LOG)

| NAME | IP ADDRESS | DATE |
|---|---|---|
| Node_A | 10:***.44.67 | 2004/8/11 13:15 |
| Node_B | 10:***.55.34 | 2004/8/06 11:18 |
| Node_C | 10:***.55.37 | 2004/3/15 17:07 |
| Node_C | 2001:****:c10:8000::242 | 2004/7/01 10:55 |
| Node_D | 2001:****:c10:8000::246 | 2004/8/21 20:49 |
| ... | ... | ... |

FIG.3B (SETTING DATA)

| IP Mode | Dual/IPv4/IPv6 |
|---|---|
| IPv4 AUTOMATIC SETTING | enable/disable |
| IPv4 ADDRESS | **** |
| IPv4 SUBNET MASK | **** |
| IPv4 DEFAULT GATEWAY | **** |
| IPv6 ADDRESS | **** |
| PRIMARY DNS SERVER ADDRESS | **** |
| SECONDARY DNS SERVER ADDRESS | **** |
| SMTP SERVER ADDRESS | **** |
| POP SERVER ADDRESS | **** |
| MAIL ADDRESS | **** |
| POP·USER NAME | **** |
| POP·PASSWORD | **** |
| ... | ... |

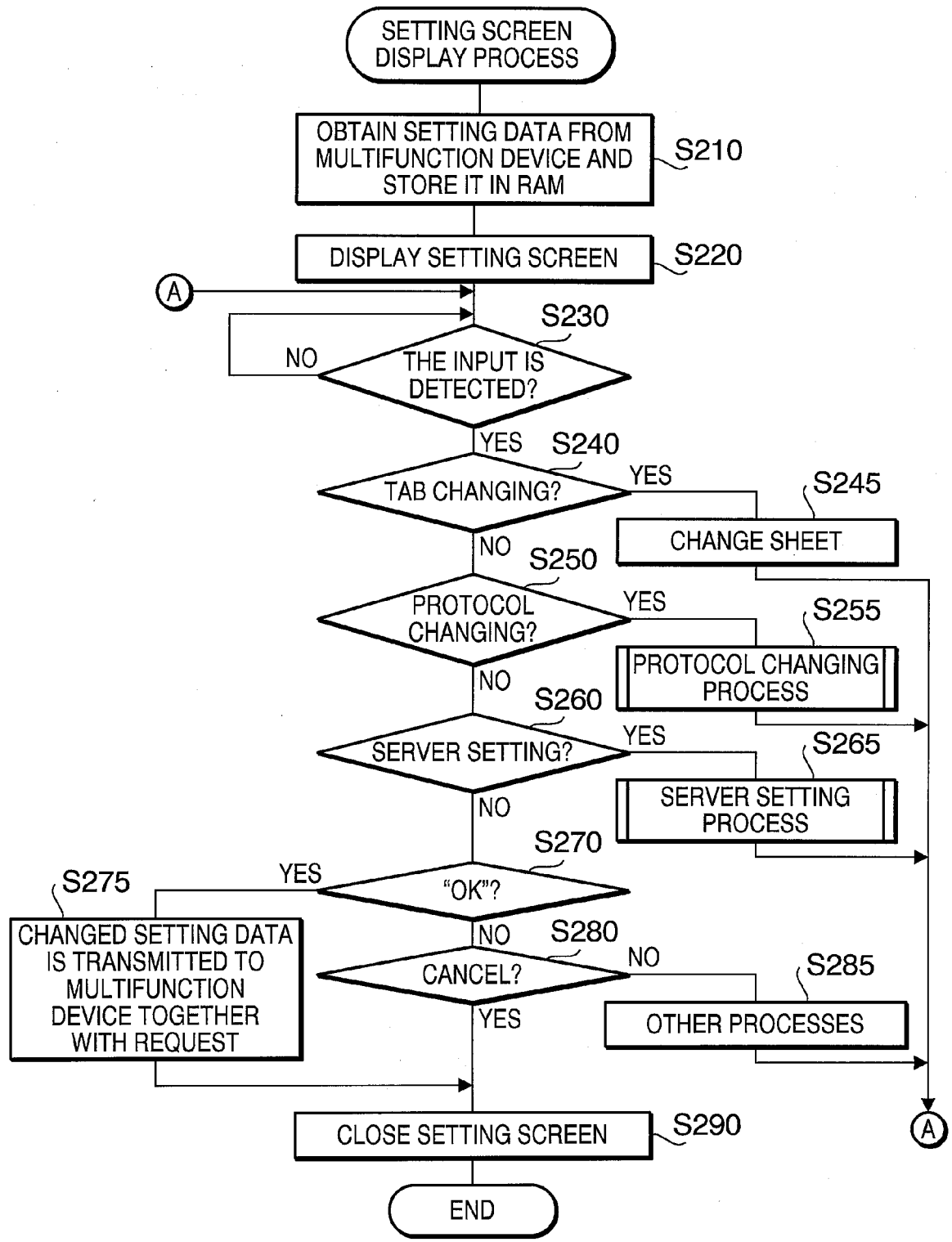

FIG. 17A — YOU ARE SETTING IPv4 ADDRESS DESPITE THE FACT THAT IP MODE IS IPv6. PLEASE ENTER IPv6 ADDRESS. OK

FIG. 17B — YOU ARE SETTING IPv6 ADDRESS DESPITE THE FACT THAT IP MODE IS IPv4. PLEASE ENTER IPv4 ADDRESS. OK

SYSTEM, DEVICE, METHOD AND COMPUTER PROGRAM PRODUCT FOR MANAGING DEVICES

CROSS-REFERENCE TO RELATED APPLICATIONS

This application is a continuation of co-pending U.S. application Ser. No. 13/245,213, which is a continuation of U.S. Pat. No. 8,085,788, which claims priority of Japanese Patent Application No. 2004-289134, filed on Sep. 30, 2004. The entire subject matters of which are incorporated herein by reference as example embodiments.

BACKGROUND

1. Technical Field

Aspects of the present invention relate to a management system for managing a communication device that communicates with various type of devices through a network using a plurality of types of protocols.

2. Description of Related Art

An internet protocol (IP) is widely used for communicating with various types of devices through a network. Examples of a network system in which the internet protocol is used in data communication are disclosed in Japanese Patent Provisional Publications Nos. 2004-32699, 2000-183874, and 2001-034434.

The internet protocol is now moving from IPv4 (Internet Protocol version 4) to IPv6 (Internet Protocol version 6). Therefore, in many cases, devices using IPv4 and devices using IPv6 are mixed in a single network environment. For this reason, recently, communication devices capable of using both of the IPv4 and IPv6 are developed and proposed. Typically, such a device is configured such that an ON/OFF state of each of the function of IPv4 communication and the function of IPv6 communication can be controlled.

In the communication based on the internet protocol, to communicate with a certain device (e.g., a server), a communication device sends a packet, containing an IP address or a domain name of the certain device, to a network. That is, the IP address or the domain name contained in the packet designates a destination (a destination device) to which the packet is sent. In the communication between the communication device and a destination device, if an IP address based on an IPv4 format is registered in the communication device as setting data regarding the destination device, while the IPv4 communication function of the communication device is in an OFF state, the communication device can not communicate with the destination device.

In the communication in which the destination device is designated by a domain name, the communication device accesses a DNS (Domain Name System) server to change the domain name to an IP address. In such a case, if the ON/OFF states of the IPv4 and IPv6 communication functions of the communication device do not match with the IP protocol of the DNS server, the communication device can not access the DNS server.

That is, in the communication in which a communication device having the IPv4 and IPv6 communication functions is involved, there is a possibility that the ON/OFF states of the IPv4 and IPv6 communication functions of the communication device do not match with the setting data (e.g. destination addresses of destination devices) stored in the communication device. If such inconsistency arises between the ON/OFF states of the IPv4 and IPv6 communication functions and the setting data regarding the communication stored in the communication device, the communication in which the communication device is involved becomes unsuccessful.

If the setting data of a communication device having the IPv4 and IPv6 communication functions is changed, a possibility arises that a device, which is capable of using only one of the IPv4 and IPv6 functions, will become unable to communicate with the communication device.

In other words, if inconsistency arises between a communication function of a destination device and a protocol which a communication device uses to communicate with the destination device, the communication between the communication device and the destination device will become unsuccessful.

SUMMARY

Aspects of the present invention are advantageous in that they provide a system, a device, a method and a computer program product which are capable of preventing trouble from arising in communications in which a communication device having an IPv4 communication function and an IPv6 communication function is involved if settings of the communication device is changed. In this structure, the communication device is connected to a network including a device capable of using the IPv4 communication function and a device capable of using the IPv6 communication function.

BRIEF DESCRIPTION OF THE ACCOMPANYING DRAWINGS

FIG. 3A is a table showing an access log stored in the multifunction device in accordance with aspects of the present invention.

FIG. 3B is a table illustrating setting data stored in the multifunction device in accordance with aspects of the present invention.

FIG. 5 is a flowchart illustrating a setting screen display process in accordance with aspects of the present invention.

FIGS. 17A and 17B show examples of a warning message box displayed in the server setting process in accordance with aspects of the present invention.

DETAILED DESCRIPTION

Figure 1:
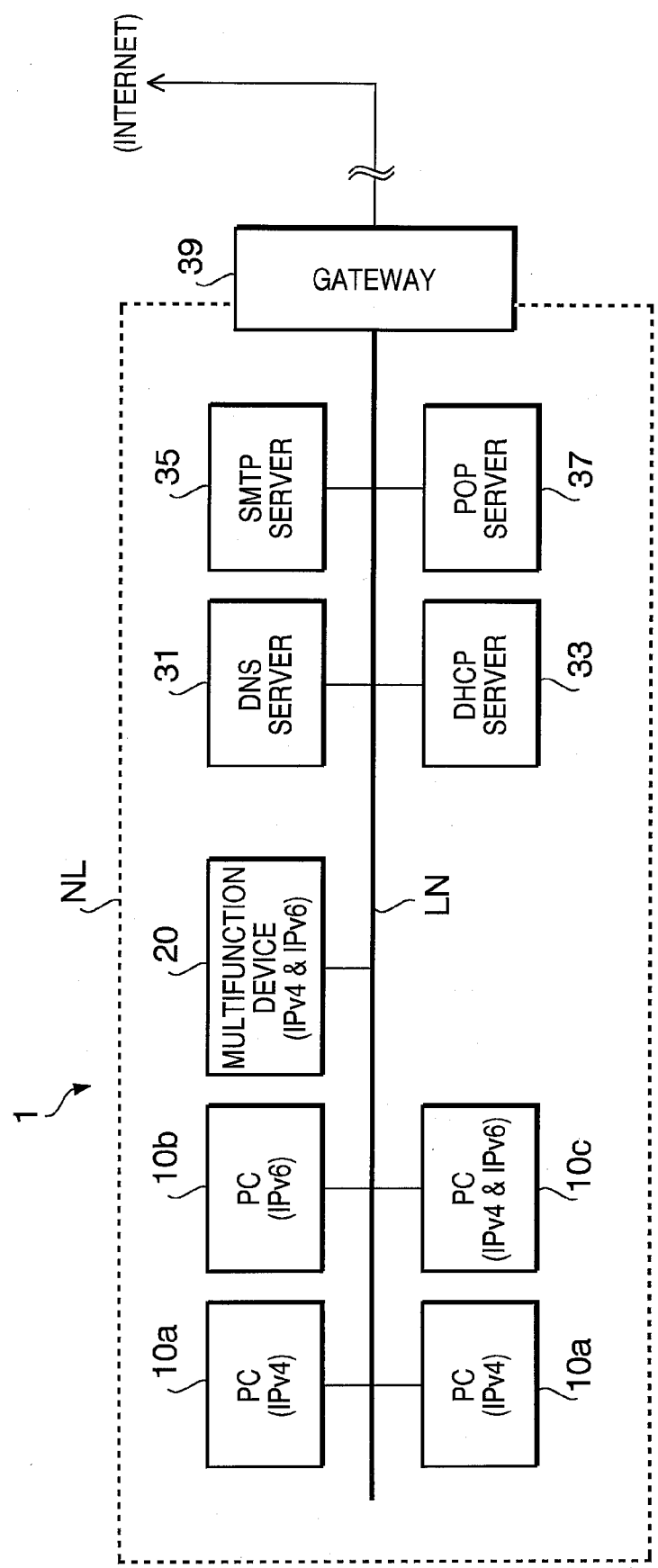
FIG. 1 is a block diagram illustrating a management system for managing devices on a network in accordance with aspects of the present invention.

General Overview of Aspects of the Invention

According to an aspect of the present invention, a system for managing a communication device having a first function of using a first communication protocol and a second function of using a second communication protocol is provided. The communication device may be connected to a network including a first device using the first communication protocol and a second device using the second communication protocol. The system may be provided with an inputting system that accepts an input for changing an operation regarding communication of the communication device from a user, and a judging system that judges whether a trouble would arise in communication, in which the communication device is involved, based on the input inputted by the user through use of the inputting system.

With this configuration, it becomes possible to prevent that the trouble would arise in the communication in which the communication device is involved due to the fact that the operation of the communication device is changed.

Optionally, the system may include a setting system that changes the operation of the communication device if the judging system judges that the trouble (and/or incompatibility) would not arise, and does not change the operation of the communication device if the judging system judges that the trouble (and/or incompatibility) would arise.

With this configuration, the operation of the communication device is controlled appropriately by the setting system in accordance with the judgment result of the judging system.

Still optionally, the input inputted by the user through use of the inputting system may include setting data for changing the operation of the communication device. The setting system may set the setting data to the communication device if the judging system judges that the trouble (and/or incompatibility) would not arise, and may not set the setting data to the communication device if the judging system judges that the trouble (and/or incompatibility) would arise.

With this configuration, the trouble due to inappropriate setting data is avoided.

Still optionally, the judging system may cancel the setting data inputted by the user if the judging system judges that the trouble would arise.

This configuration helps prevent inappropriate setting data from being actually applied to the communication device.

Still optionally, the system may include a management device connected to the network. In this case, the management device may have the first function of using the first communication protocol and the second function of using the second communication protocol. The inputting system, the judging system and the setting system may be implemented in the management device.

With this configuration, the operation of the communication device can be controlled remotely from the management device. If a user of the communication device is in a place away from the communication device, it is very difficult for the user to handle the trouble that occurred on the communication device. According to the above mentioned configuration, the occurrence of the trouble is prevented by the management device. Therefore, the above mentioned configuration is very convenient particularly for the user who is located remote from the communication device.

In an example, the judging system may judge whether the trouble would arise in communication between the management device and the communication device.

This configuration prevents the trouble from arising between the management device and the communication device.

Optionally, the input inputted by the user through use of the inputting system may include first setting data for switching each of the first function of using the first communication protocol and the second function of using the second communication protocol of the communication device to ON or OFF. In this case, the judging system may judge whether the trouble would arise when the first setting data is inputted by the user through use of the inputting system.

With this configuration, it is prevented that the trouble arises due to the fact that the ON/OFF state of the first function or the second function of the communication device is changed.

Still optionally, the system may include a log recording system that records log information regarding a protocol of at least one device which communicated with the communication device using the protocol through the network in a past predetermined time period. In this case, the judging system may judge whether the trouble would arise based on the log information recorded by the recording system.

This configuration helps prevent devices, which frequently communicate with the multifunction device, from becoming unable to communicate with the communication device.

In an example, the judging system may consult the log information to judge whether a device, which will become unable to communicate with the communication device, exists in the at least one device recorded in the log information if the first setting data is set to the communication device. In this case, the judging system may judge that the trouble would arise if it is judged that the device, which will become unable to communicate with the communication device, exists in the at least one device recorded in the log information.

In another example, the judging system may judge that the trouble would arise if inconsistency occurs between the protocol of the at least one device recorded in the log information and ON/OFF states of the first function and the second function of the communication device determined by the first setting data.

Optionally, the system may include a protocol judgment system that judges a protocol of a predetermined device connected to the network. In this case, the judging system may judge that the trouble would arise if inconsistency occurs between the protocol of the predetermined device judged by the protocol judgment system and ON/OFF states of the first function and the second function of the communication device determined by the first setting data.

This configuration prevents the communication device from becoming unable to communicate with the predetermined device after the ON/OFF state of the first and second functions of the communication device are changed.

Still optionally, the input inputted by the user may include second setting data regarding setting of a certain device connected to the network. In this case, the judging system may judge that the trouble would arise if an inconsistency occurs between the setting of the certain device determined by the second setting data and ON/OFF states of the first function and the second function of the communication device.

This configuration prevents the system from an unsuccessful communication between the communication device and the certain device.

Still optionally, the second setting data may include a network address of the certain device.

This configuration prevents the communication between the communication device and the certain device from becoming unsuccessful due to the fact that the user enters an inappropriate address.

In an example, the judging system may judge that the trouble would arise if the network address of the certain device inputted by the user corresponds to the first communication protocol and the first function of the communication device is in an OFF state, or if the network address of the certain device inputted by the user corresponds to the second communication protocol and the second function of the communication device is in an OFF state.

Optionally, the system may include a warning message notifying system that notifies the user that the trouble would arise in the communication, in which the communication device is involved, if the judging system judges that the trouble would arise.

Since the user is notified via a warning message, the operation of the communication device is prevented from actually changing in the case where the judging system judges that the trouble would arise.

Still optionally, the warning message notifying system may generate a warning message screen containing a warning message indicating that the trouble would arise in the communication in which the communication device is involved.

Since the warning message screen is generated, the user is able to notice that the trouble would arise through the warning message screen.

Still optionally, the warning message screen may contain a solution for solving the trouble arising in communication in which the communication device is involved.

Since the solution is also displayed in the warning message screen, the user is able to take appropriate steps for solving the trouble referring to the warning message screen.

In an example, the warning message screen may include a radio button for selecting the solution. In this case, the inputting system may be configured to allow the user to select the solution. The setting system may change the operation of the communication device so that the solution is applied to the communication device if the user selects the radio button through use of the inputting system.

With this configuration, the user is allowed to select the radio button to solve the trouble.

According to another aspect of the invention, there is provided a computer program product for use on a terminal device connected to a network including a first device using the first communication protocol and a second device using the second communication protocol. The computer program product includes a computer program executed to achieve a method of managing a communication device having a first function of using a first communication protocol and a second function of using a second communication protocol. The communication device is connected to the network. The method includes accepting an input for changing an operation regarding communication of the communication device from a user, and judging whether a trouble would arise in communication, in which the communication device is involved, based on the input inputted by the user in the step of the accepting.

With this configuration, the trouble is prevented that would arise in the communication in which the communication device is involved due to the fact that the operation of the communication device having been changed.

Optionally, the method may include the step of changing the operation of the communication device if it is judged in the step of the judging that the trouble does not arise, and not changing the operation of the communication device if it is judged in the step of the judging that the trouble would arise.

With this configuration, the operation of the communication device is controlled appropriately by the setting system in accordance with the judgment result of the judging system.

Still optionally, the input inputted by the user in the step of the accepting may include setting data for changing the operation of the communication device. In the step of the changing, the setting data may be set to the communication device if it is judged in the step of the judging that the trouble does not arise, and the setting data may not be set to the communication device if it is judged in the step of the judging that the trouble would arise.

With this configuration, the trouble due to inappropriate setting data is avoided.

Still optionally, the step of the judging comprises canceling the setting data inputted by the user if it is judged in the step of the judging that the trouble would arise.

With this configuration, inappropriate setting data is prevented from actually being applied to the communication device.

In an example, in the step of the judging it may be judged whether the trouble would arise in communication between the terminal device and the communication device.

With this configuration, it is prevented that the trouble arises between the terminal device and the communication device.

Optionally, the input inputted by the user in the step of the accepting may include first setting data for switching each of the first function of using the first communication protocol and the second function of using the second communication protocol of the communication device to ON or OFF. In this case, the step of the judging may be executed when the first setting data is inputted by the user in the step of the accepting.

With this configuration, it is prevented that the trouble arises due to the fact that the ON/OFF state of the first function or the second function of the communication device is changed.

Still optionally, the method may include recording log information regarding a protocol of at least one device which communicated with the communication device using the protocol through the network in a past predetermined time period. In the step of the judging it may be judged whether the trouble would arise based on the recorded log information.

With this configuration, it is prevented that devices, which frequently communicates with the multifunction device, will become unable to communicate with the communication device.

In an example, the step of the judging may include consulting the log information to judge whether a device, which will become unable to communicate with the communication device, exists in the at least one device recorded in the log information if the first setting data is set to the communication device. In the step of the judging, it may be judged that the trouble would arise if it is judged that the device, which will become unable to communicate with the communication device, exists in the at least one device recorded in the log information.

In another example, in the step of the judging it may be judged that the trouble would arise if inconsistency occurs between the protocol of the at least one device recorded in the log information and ON/OFF states of the first function and the second function of the communication device determined by the first setting data.

Optionally, the method may include judging a protocol of a predetermined device connected to the network. In the step of the judging, it may be judged that the trouble would arise if inconsistency occurs between the protocol of the predetermined device and ON/OFF states of the first function and the second function of the communication device determined by the first setting data.

With this configuration, it is prevented that, after the ON/OFF state of the first and second functions of the communication device is changed, the communication device is prevented from become unable to communicate with the predetermined device.

Still optionally, the input inputted by the user may include second setting data regarding setting of a certain device connected to the network. In the step of the judging, it may be judged that the trouble would arise if inconsistency occurs between the setting of the certain device determined by the second setting data and ON/OFF states of the first function and the second function of the communication device.

With this configuration, it is prevented that the communication between the communication device and the certain device will become unsuccessful.

Still optionally, the second setting data may include a network address of the certain device.

With this configuration, the user is prevented from entering an inappropriate address that frustrates the communication between the communication device and the certain device.

In one example, in the step of the judging it may be judged that the trouble would arise if the network address of the certain device inputted by the user corresponds to the first communication protocol and the first function of the communication device is in an OFF state, or if the network address of the certain device inputted by the user corresponds to the second communication protocol and the second function of the communication device is in an OFF state.

Optionally, the method may include notifying the user that the trouble would arise in the communication, in which the communication device is involved, if it is judged in the step of the judging that the trouble would arise.

Since the warning message is notified to the user, it is prevented that the operation of the communication device is actually changed in the case where the judging system judges that the trouble would arise.

Still optionally, the step of the notifying may include generating a warning message screen containing a warning message indicating that the trouble would arise in the communication in which the communication device is involved.

Since the warning message screen is generated, the user is able to notice that the trouble would arise through the warning message screen.

Still optionally, the warning message screen may contain a solution for solving the trouble arising in communication in which the communication device is involved.

Since the solution is also displayed in the warning message screen, the user is able to take appropriate steps for solving the trouble referring to the warning message screen.

In an example, the warning message screen may include a radio button for selecting the solution. The step of the accepting may include allowing the user to select the solution. In the set of the changing, the operation of the communication device may be changed so that the solution is applied to the communication device if the user selects the radio button.

With this configuration, the user is allowed to select the radio button to solve the trouble.

According to another aspect of the invention, there is provided a device for managing a communication device having a first function of using a first communication protocol and a second function of using a second communication protocol. The communication device is connected to a network including a first device using the first communication protocol and a second device using the second communication protocol. The device is provided with an inputting system that accepts an input for changing an operation of the communication device from a user, a judging system that judges whether a trouble would arise in communication, in which the communication device is involved, based on the input inputted by the user through use of the inputting system, and a setting system that changes the operation of the communication device if the judging system judges that the trouble does not arise, and does not change the operation of the communication device if the judging system judges that the trouble would arise.

With this configuration, it becomes possible to prevent that the trouble would arise in the communication in which the communication device is involved due to the fact that the operation of the communication device is changed.

According to another aspect of the invention, there is provided a method of remotely managing a communication device having a first function of using a first communication protocol and a second function of using a second communication protocol from a management device. The communication device and the management device are connected to a network including a first device using the first communication protocol and a second device using the second communication protocol. The method includes accepting an input for changing an operation of the communication device from a user, judging whether a trouble would arise in communication, in which the communication device is involved, based on the input inputted by the user in the step of the accepting, and changing the operation of the communication device if it is judged in the step of the judging that the trouble does not arise, and not changing the operation of the communication device if it is judged in the step of the judging that the trouble would arise.

With this configuration, it becomes possible to prevent that the trouble would arise in the communication in which the communication device is involved due to the fact that the operation of the communication device is changed. Further, it is noted that various connections are set forth between elements in the following description. It is noted that these connections in general and, unless specified otherwise, may be direct or indirect and that this specification is not intended to be limiting in this respect.

Embodiments of the Present Invention

Hereafter, an embodiment according to the invention will be described with reference to the accompanying drawings.

FIG. 1 is a block diagram illustrating a management system 1 for managing a device on a network according to an embodiment of the present invention. As shown in FIG. 1, the management system 1 includes a network NL. The network NL includes a plurality of personal computers 10a, 10b and 10c, a multifunction device 20, a DNS server 31, a DHCP (Dynamic Host Configuration Protocol) server 33, a SMTP (Simple Mail Transfer Protocol) server 35, a POP (Post Office Protocol) server 37, and gateway 39. In FIG. 1, to two PCs operating based on the IPv4, the same reference number 10a is assigned. Since the PC 10a, 10b and 10c have substantially the same configuration, the PC 10a, 10b and 10c are frequently referred to as a PC 10 in the following explanation. Only if the feature of one of the PC 10a 10b and 10c is to be explained, one of the reference numbers 10a, 10b and 10c is used.

Figure 2A:
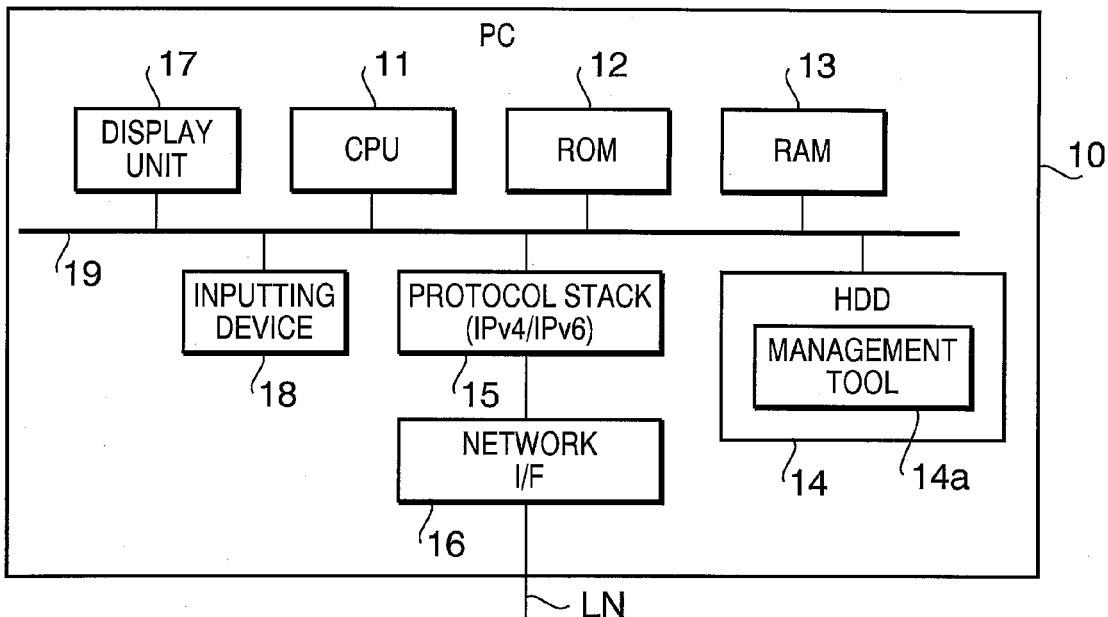
FIG. 2A is a block diagram illustrating a configuration of a management PC in accordance with aspects of the present invention.
Figure 2B:
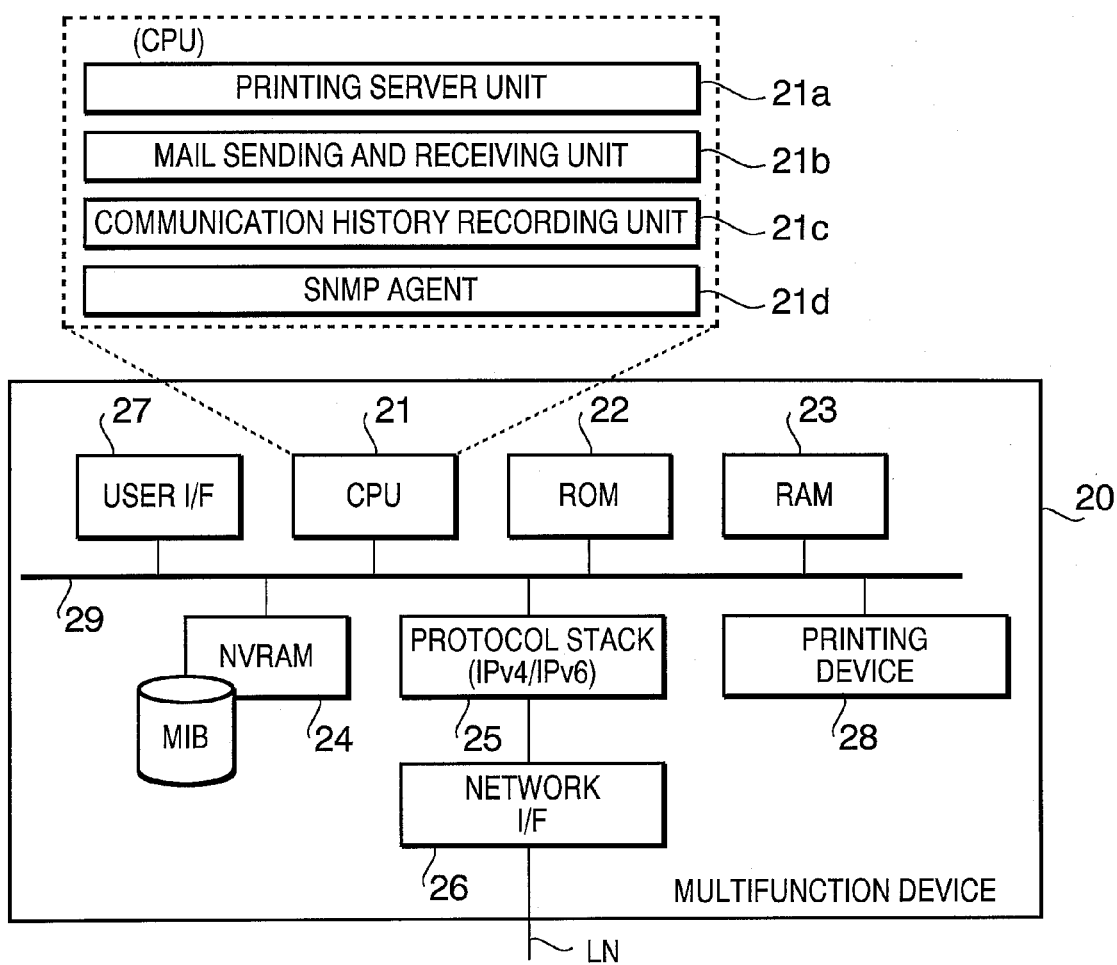
FIG. 2B is a block diagram illustrating a configuration of a multifunction device in accordance with aspects of the present invention.

FIG. 2A is a block diagram illustrating a configuration of the PC 10. FIG. 2B is a block diagram illustrating a configuration of the multifunction device 20. The network NL is designed to use the internet protocol. The network NL is connected to the Internet through the gateway 39. Each device in the network NL has a protocol stack based on at least one of the IPv4 and IPv6. A device in the network NL communicates with another device in the network NL using the protocol stack implemented therein.

As shown in FIG. 2A, the PC 10 includes a CPU (central processing unit) 11 which executes various types of operations, a ROM (read only memory) 12 in which programs are stored, a RAM (random access memory) 13 used as a work memory, an HDD (hard disk drive) 14, a protocol stack 15 used for communicating operations, a network interface (I/F) 16 to which a network cable LN is connected, a display unit 17 (including, for example, a liquid crystal display), an inputting device 18 (e.g., a keyboard and a pointing device), which are connected directly or indirectly to each other through a bus 19.

The protocol stack 15 is a conceptual box representing that communication through the network interface 16 is executed in accordance with the protocol stack 15 of IPv4 and/or IPv6. In actuality, the protocol stack 15 is implemented by program modules for communication based on the IPv4 and/or program modules for communication based on the IPv6. Such program modules are stored in the HDD 14. By executing the program modules of the protocol stack 15 by the CPU 11, the PC 10 functions as a communicating device for communicating with devices including the multifunction device 20 in the network NL using the IPv6 and/or IPv4.

More specifically, the PC 10a is provided with the program modules for communication based on the IPv4. By executing the program modules by the CPU 11, the PC 10a functions as a communicating device for communicating with a device using the IPv4. The PC 10b is provided with the program modules for communication based on the IPv6. By executing the program modules by the CPU 11, the PC 10b functions as a communicating device for communicating with a device using the IPv6. The PC 10c is provided with the program modules for communication based on the IPv6 and IPv4. By executing the program modules by the CPU 11, the PC 10c functions as a communicating device for communicating with a device using the IPv6 and IPv4.

One of the PCs 10a, 10b and 10c is provided with a management tool (program) 14a in the HDD 14. The management tool 14a has the function of remotely changing settings of the multifunction device 20 based on a SNMP (Simple Network Management Protocol). Hereafter, the PC provided with the management tool 14a is referred to as a management PC. By executing the management tool 14a by the CPU 11, the management PC can change the setting of the multifunction device 20 through the network NL based on the SNMP.

As shown in FIG. 2B, the multifunction device 20 includes a CPU (central processing unit) 21 which executes various types of operations, a ROM (read only memory) 22 in which programs are stored, a RAM (random access memory) 23 used as a work memory, a NVRAM (Non Volatile RAM) 24, a protocol stack 25 used for communicating operations, a network interface (I/F) 26 to which a network cable LN is connected, a user interface (I/F) 27, and a printing unit 28, which are connected directly or indirectly to each other through a bus 29.

The protocol stack 25 is a conceptual box representing that communication through the network interface 26 is executed in accordance with the protocol stack 25 of IPv4 and/or IPv6. In actuality, the protocol stack 25 is implemented by program modules for communication based on the IPv4 and/or program modules for communication based on the IPv6.

The multifunction device 20 attains the communication function based on IPv6 (IPv6 communication function) by executing the program modules of the IPv6 by the CPU 21, the communication function based on IPv4 (IPv4 communication function) by executing the program modules of the IPv4 by the CPU 21, the communication function based on IPv6 and IPv4 by executing the program modules of the IPv6 and IPv4 by the CPU 21. Each of the IPv6 communication function and the IPv4 communication function of the multifunction device 20 can be switched to ON or OFF.

In the ROM 22 (or the NVRAM 24) of the multifunction device 20, a program for receiving printing data from the PC 10 on the network NL in accordance with lpr (Line Printer daemon protocol) and for causing the printing unit 28 to perform a printing operation for forming an image based on the received printing data is stored. By executing this program, the CPU 21 functions as a printing server unit 21a. In the ROM 22 (or the NVRAM 24), a mail program for sending a mail through a SMTP server and for receiving a mail stored in a POP server (e.g., a POP3 server) is stored. By executing the mail program, the CPU 21 functions as a mail sending and receiving unit 21b.

In the NVRAM 24, a database (MIB: Management Information Base) is stored. In the database (MIB), settings regarding the multifunction device 20 are stored. Also, in the NVRAM 24, an agent program for notifying the settings in the database and for updating the settings in the database in response to a command from the management PC is stored. By executing the agent program, the multifunction device 20 functions as a SNMP agent 21d which provides information of the settings in the database to the management PC and updating the settings thereof in response to the request from the management PC.

In the ROM 22 (or the NVRAM 24) of the multifunction device 20, a program for recording communication history information, regarding devices which communicated with the multifunction device 20, in an access log (see FIG. 3A) in the NVRAM 24 is stored. By executing this program, the CPU 21 functions as a communication history recording unit 21c. The access log recorded in the MIB of the multifunction device 20 is supplied from the multifunction device 20 to the management PC based on SNMP.

Next, the above mentioned access log and the settings will be explained in detail. FIG. 3A is a table illustrating in detail a configuration of the access log. FIG. 3B is a table illustrating in detail a configuration of the settings. As shown in FIG. 3A, the access log contains source devices (Node_A, Node_B, . . . ) that have accessed the multifunction device 20 in a past predetermined time period. Specifically, the access log contains, for each of the source devices, a node name (which is a name of a device assigned on a network), an IP address corresponding to the node name, and the latest access date. It should be noted that the access log contains separate pieces of data for the same device if the device accessed the multifunction device 20 in different address formats. That is, for the same device, the latest access date is recorded for each of the accessing address formats.

As shown in FIG. 3A, with regard to the same node_C, the IP address and the latest access date are recorded for each of the address formats of IPv4 and IPv6. The IP address based on the IPv4 is represented by 32 bit data, and the IP address based on the IPv6 is represented by 128 bit data.

As shown in FIG. 3B, setting data stored in the NVRAM 24 include a setting value of the IP mode, a value indicating whether automatic IPv4 setting is valid or invalid, a value of its own IP (IPv4) address used for IPv4 based communication, a value of a subnet mask of the IPv4, a value of an IP address of a default gateway used for the IPv4 based communication, a value of its own IP (IPv6) address used for IPv6 based communication, a value of an IP address of a primary DNS server, a value of an IP address of a secondary DNS server functioning as a proxy for the primary DNS server, a value of an address (an IP address or a domain name) of an SMTP server used for sending mails by the mail sending and receiving unit 21*b*, a value of an address (an IP address or a domain name) of a POP (e.g., POP3) server used for receiving mails, a value of its own mail address, a value of a user name used for user authentication for receiving mails from the POP server, and a value of a password.

The CPU 21 of the multifunction device 20 operates by using such setting data stored in the NVRAM 24. For example, the CPU 21 of the multifunction device 20 communicates with the SMTP server using the value indicating the address of the SMTP server, and obtains mails from the POP server using the value indicating the address of the POP server.

The CPU 21 of the multifunction device 20 stores the setting data in the MIB. If the CPU 21 of the multifunction device 20 receives a request for setting data (e.g., GetRequest) from the management PC through the network interface 26, the CPU 21 sends a response signal containing the setting data (e.g., GetResponce) back to the management PC based on the SNMP. If the CPU 21 receives a request for changing the setting data (e.g., SetRequest) from the management PC through the network interface 26, the CPU 21 changes its own settings according to the request, and updates the settings in the NVRAM 24.

Figure 4:
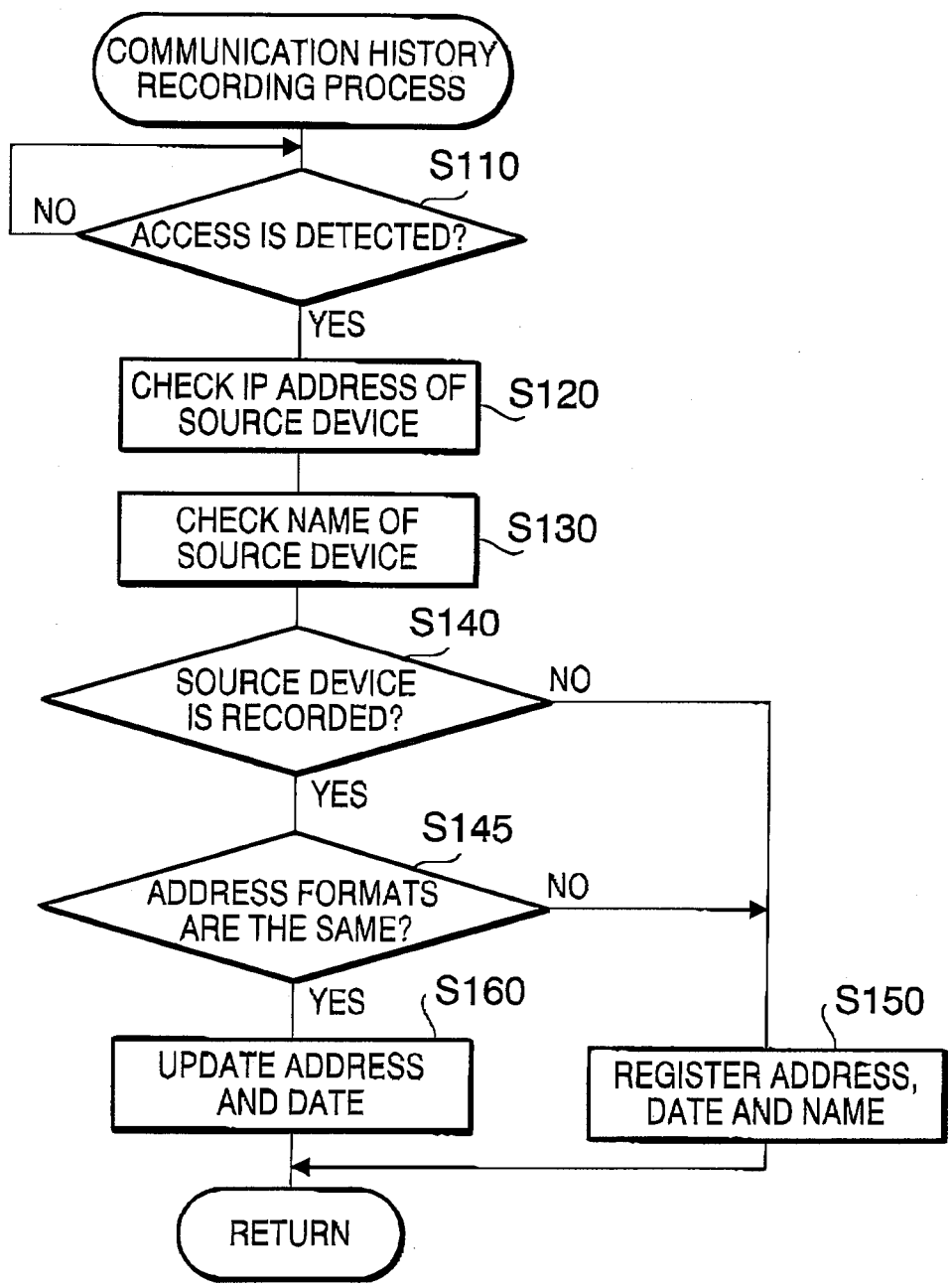
FIG. 4 is a flowchart illustrating a communication history recording process in accordance with aspects of the present invention.

The access log is updated when the communication history recording unit 21*c* (the CPU 21) executes a communication history recording process. FIG. 4 is a flowchart illustrating the communication history recording process. The communication history recording process is executed periodically by the CPU 21 after power of the multifunction device 20 is turned to ON.

First, the CPU 21 of the multifunction device 20 waits until an external device accesses the multifunction device 20 (S110: NO). If access from the external device (hereafter, referred to as a source device) is detected (S110: YES), control proceeds to step S120 where the CPU 21 obtains an IP address of the source device from a received packet (S120). Then, the CPU 21 obtains a node name of the source device (S130). In step S130, if the CPU 21 needs to obtain a domain name as the node name of the source device, the CPU 21 may access the DNS server 21 to obtain the domain name by using the obtained IP address. Such a retrieval of the domain name is frequently called an inverted retrieval.

After the step S130 is finished, the CPU 21 judges whether the access log includes the communication history information of a domain name which is the same as that of the source device (S140). If the communication history information of a domain name which is the same as that of the source device is not recorded in the access log (S140: YES), communication history information of the source device (i.e., the IP address obtained in step S120, the node name obtained in step S130 and a current date) is added to the access log (S150). In step S150, if the size of the access log exceeds a predetermined data size, information having the oldest access date may be deleted from the access log and thereafter the communication history information of the source device may be added to the access log.

If the communication history information of a domain name, which is the same as that of the source device, is recorded in the access log (S140: YES), control proceeds to step S145. In step S145, the CPU 21 judges whether the IP address corresponding to the domain name, which is the same as that of the source device, is equal to the IP address of the source device obtained in step S120.

Specifically, in step S145, if a format of the IP address of the source device obtained in step S120 is the IPv4 format and a format of the IP address of the source device already recorded in the access log is the IPv6 format, or a format of the IP address of the source device obtained in step S120 is the IPv6 format and a format of the IP address of the source device already recorded in the access log is the IPv4 format, then the CPU 21 judges that the IP address of the source device obtained in step S120 is different from the IP address of the source device already recorded in the access log (S145: NO). Then, control proceeds to step S150.

If a format of the IP address of the source device obtained in step S120 is the IPv4 (IPv6) format and a format of the IP address of the source device already recorded in the access log is the IPv4 (IPv6) format, then the CPU 21 judges that the IP address of the source device obtained in step S120 is equal to the IP address of the source device already recorded in the access log (S145: YES). In this case, control proceeds to step S160 where the CPU 21 changes the IP address and the access date already recorded in the access log to the IP address obtained in step S120 and a current date, respectively (S160). After the access log is thus updated in step S160, the communication history recording process terminates.

Next, a setting screen display process which is executed by the CPU 11 of the management PC as the function of the management tool 14*a* will be explained. FIG. 5 is a flowchart illustrating the setting screen display process.

First, the CPU 11 of the management PC sends a request (e.g., GetRequest) for obtaining the setting data (shown in FIG. 3A) to the multifunction device 20 through the network interface 16 based on the SNMP. Then, the CPU 11 of the management PC receives the setting data from the multifunction device 20, and stores the received setting data in the RAM 13 (S210). Next, the CPU 11 creates and displays a setting screen 101, in which the obtained setting data is represented in a tab sheet format, on the display unit 17 (S220).

Figure 6A:
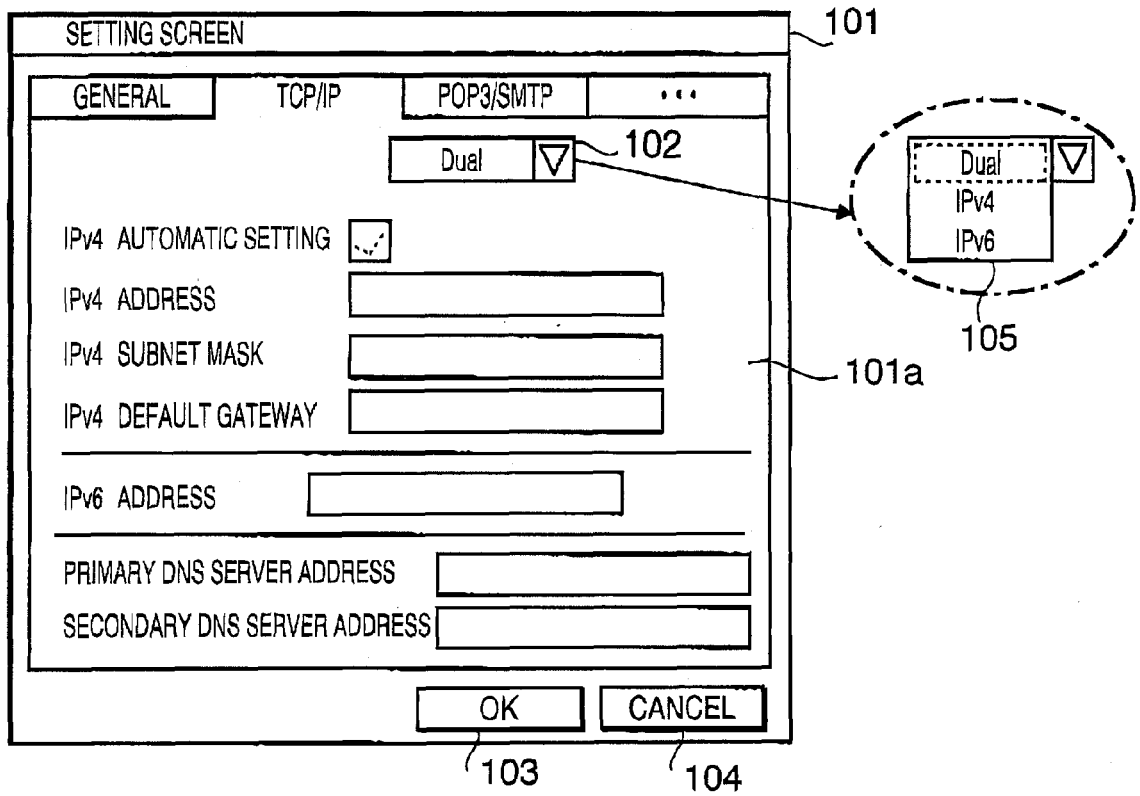
FIGS. 6A and 6B are illustrative illustrations of a setting screen displayed the setting screen display process in accordance with aspects of the present invention.
Figure 6B:
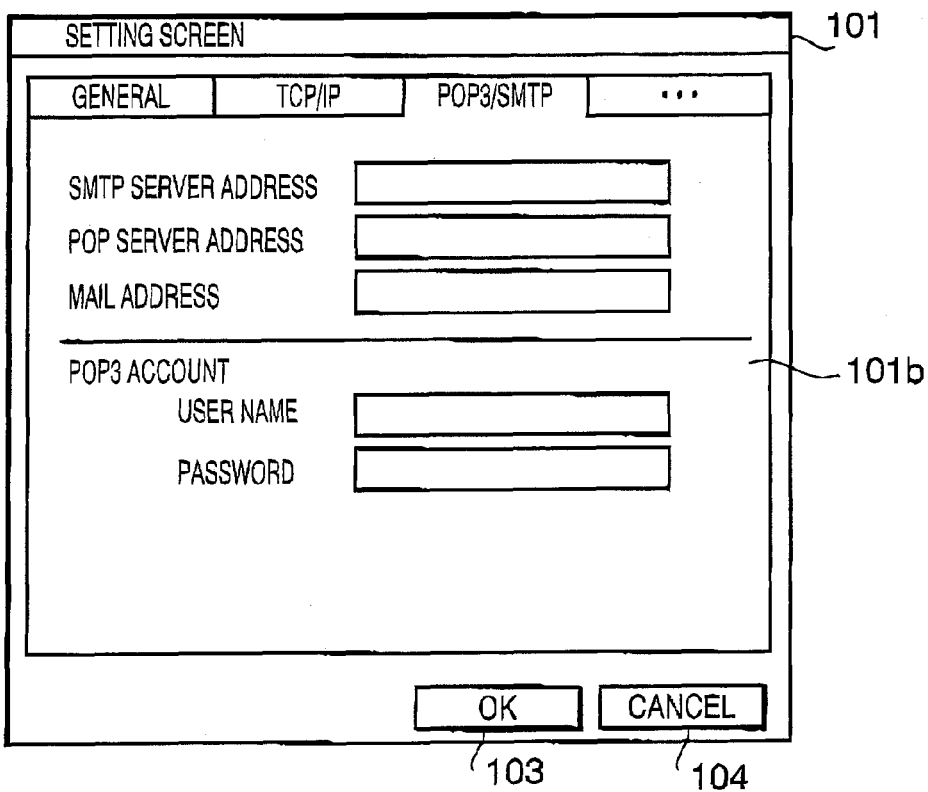

FIGS. 6A and 6B are illustrator illustrations of the setting screen 101 displayed in step S220. As shown in FIGS. 6A and 6B, the setting screen 101 includes a plurality of tab screens each of which has a tab and a corresponding dialog box. Specifically, the setting screen 101 includes a tab sheet 101*a* (shown in FIG. 6A) having a dialog box in which a plurality of types of setting items regarding a communication protocol (i.e., TCP/IP) are represented, and a tab sheet 101*b* (shown in FIG. 6B) having a dialog box in which a plurality of types of setting items regarding a POP server and a SMTP server are represented. In step S220, one of tab sheets defined as an initial tab sheet is displayed on the front side.

After the step S220 is finished, the CPU 11 judges whether an instruction is inputted to the management PC through use of the inputting device 18 (S230). If the instruction is not inputted by the user (S230: NO), the step S230 is repeated. If the instruction is inputted to the management PC by the user (S230: YES), control proceeds to step S240. In step S240, the CPU 11 judges whether the inputted instruction is an instruction for tab changing. If the instruction is the tab changing (S240: YES), the CPU 11 changes the tab screen to be displayed on the front side in accordance with the inputted instruction (S245). Then control returns to step S230.

If the inputted instruction is not the tab changing (S240: NO), the CPU 11 judges whether the inputted instruction is an instruction for protocol changing (S250). In this embodiment, if a setting item 102 of an IP mode is selected by the user through use of the inputting device 18, the CPU 11 judges that the inputted instruction is the instruction for protocol changing.

If the inputted instruction is the instruction for protocol changing (S250: YES), a protocol changing process is executed in step S255. The protocol changing process will be explained later. After the step S255 is finished, control returns to step S230.

If the inputted instruction is not the instruction for protocol changing (S250: NO), the CPU 11 judges whether the inputted instruction is an instruction for setting a server (S260). In step S260, if an input field of a primary DNS server address or a secondary DNS server address in the tab sheet 101a shown in FIG. 6A is selected by the user by use of the inputting device 18, or an input field of an SMTP server address or an POP server address is selected by the user by use of the inputting device 18, the CPU 11 judges that the inputted instruction is the instruction for setting a server.

If it is judged in step S260 that the inputted instruction is the instruction for setting a server (S260: YES), a server setting process is executed in step S265. The server setting process will be explained later. After the step S265 is finished, control returns to step S230.

If it is judged in step S260 that the inputted instruction is not the instruction for setting a server (S260: NO), control proceeds to step S270. In step S270, the CPU judges whether an OK button 103 is pressed. If the OK button 103 is pressed (S270: YES), control proceeds to step S275. In step S275, setting data in the RAM 13 updated through use of the setting screen 101 is sent to the multifunction device 20 together with a request for changing settings (e.g., SetRequest), so that the updated setting data is applied to the multifunction device 20. As described later, the setting data obtained from the multifunction device 20 in step S210 is updated in the protocol changing process or the server setting process, and the updated setting data is applied to the multifunction device 20 when the OK button 103 is pressed.

By the step S275, the setting data updated by the user through use of the setting screen 101 is applied to the multifunction device 20, and thereafter the multifunction device 20 operates in accordance with the updated setting data (which is newly stored in the NVRAM 24).

After the step S275 is finished, the CPU 11 closes the setting screen 101 displayed on the display unit 17. Then, the setting screen display process of FIG. 5 terminates.

If it is judged in step S270 that the OK button 103 is not pressed (S270: NO), control proceeds to step S280. In step S280, the CPU 11 judges whether a Cancel button 104 is pressed. If the Cancel button 104 is pressed (S280: YES), control proceeds to step S290 where the setting screen 101 is closed. If the Cancel button 104 is not pressed (S280: NO), control proceeds to step S285 where the CPU executes another process corresponding to another instruction inputted by the user through use of the inputting device 18. Then, control returns to step S230.

Figure 7:
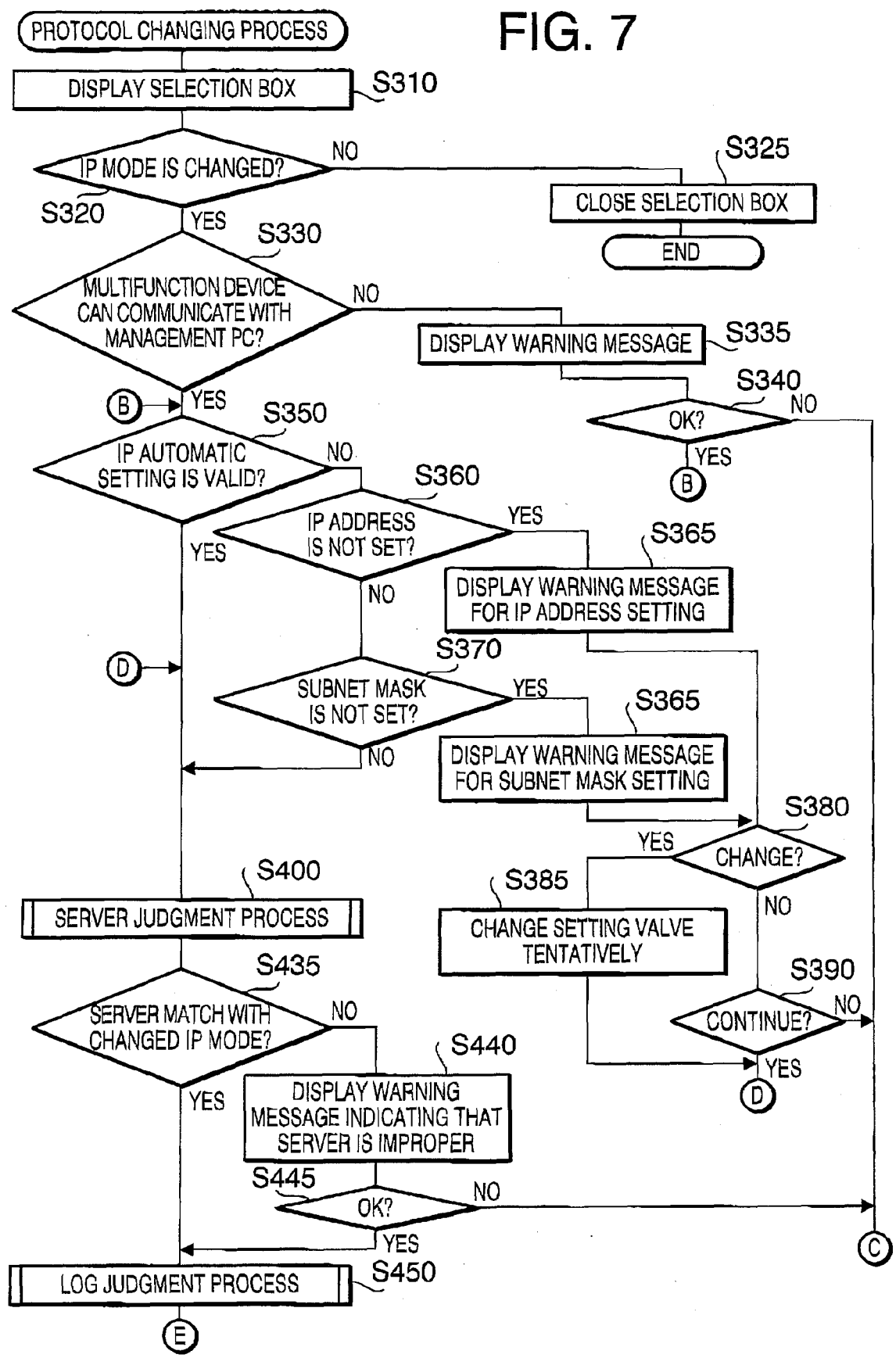
FIGS. 7 and 8 show a flowchart of a protocol changing process in accordance with aspects of the present invention.
Figure 8:
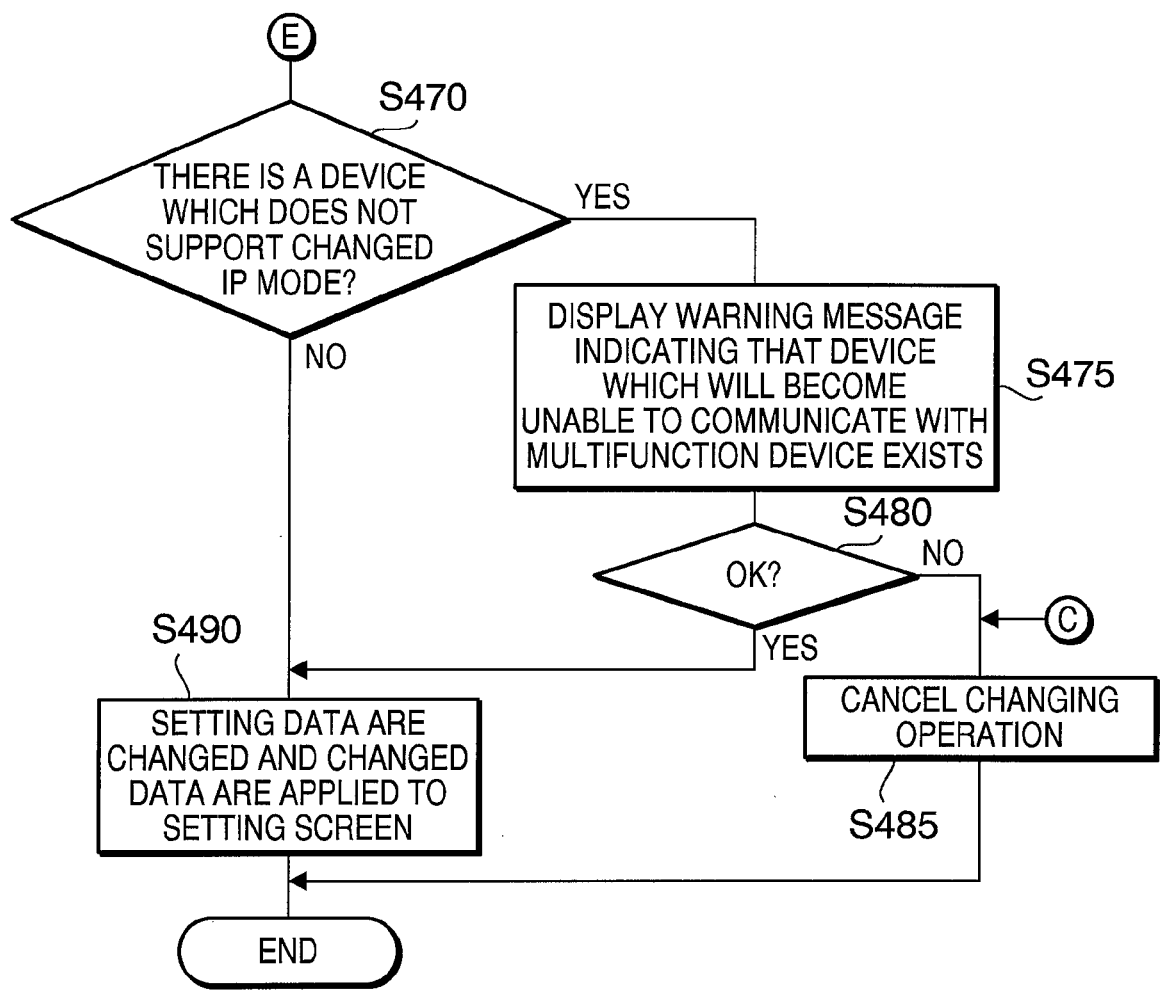
Figure 9:
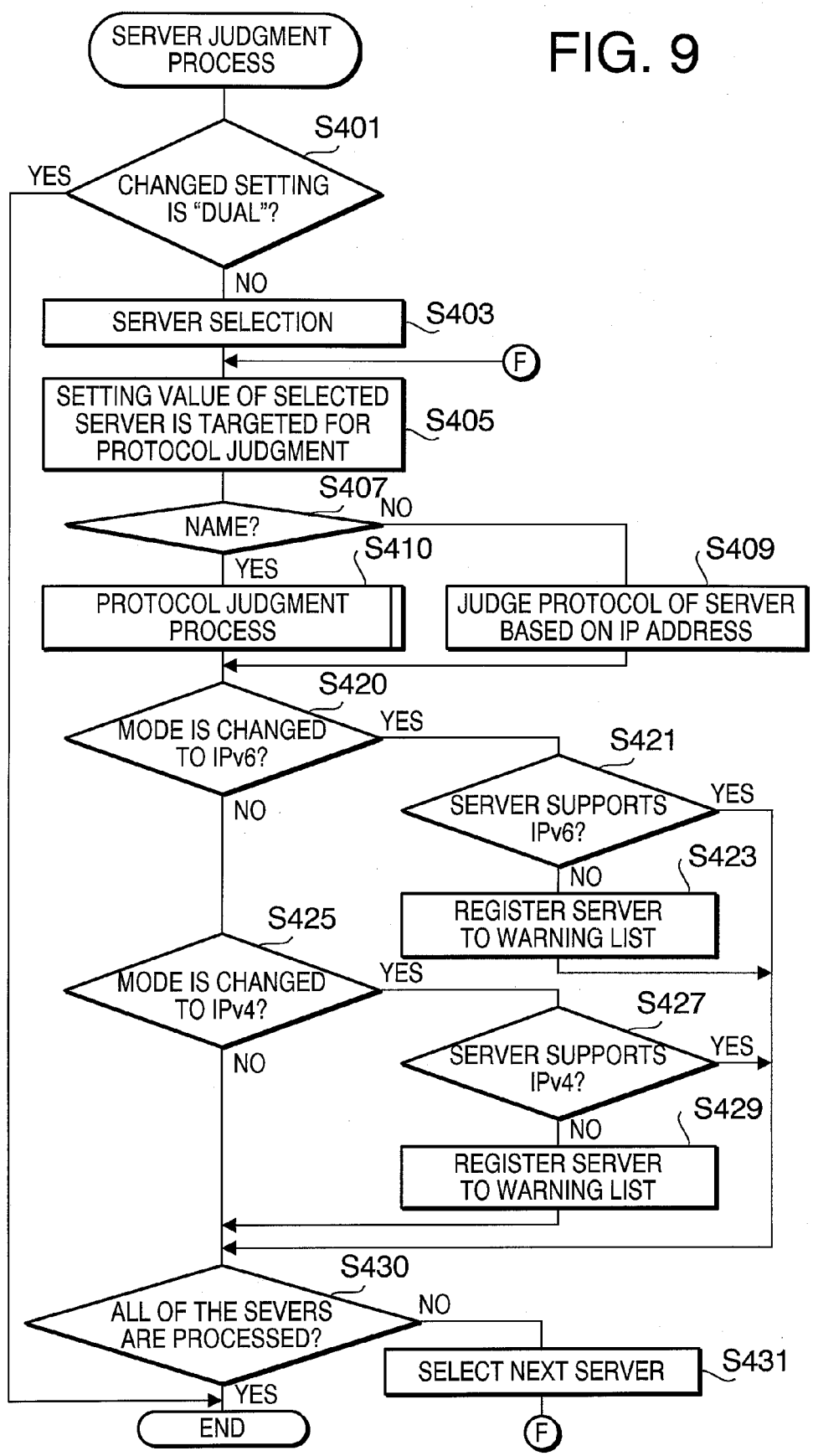
FIG. 9 is a flowchart illustrating a server judgment process which is executed in the protocol changing process in accordance with aspects of the present invention.
Figure 10:
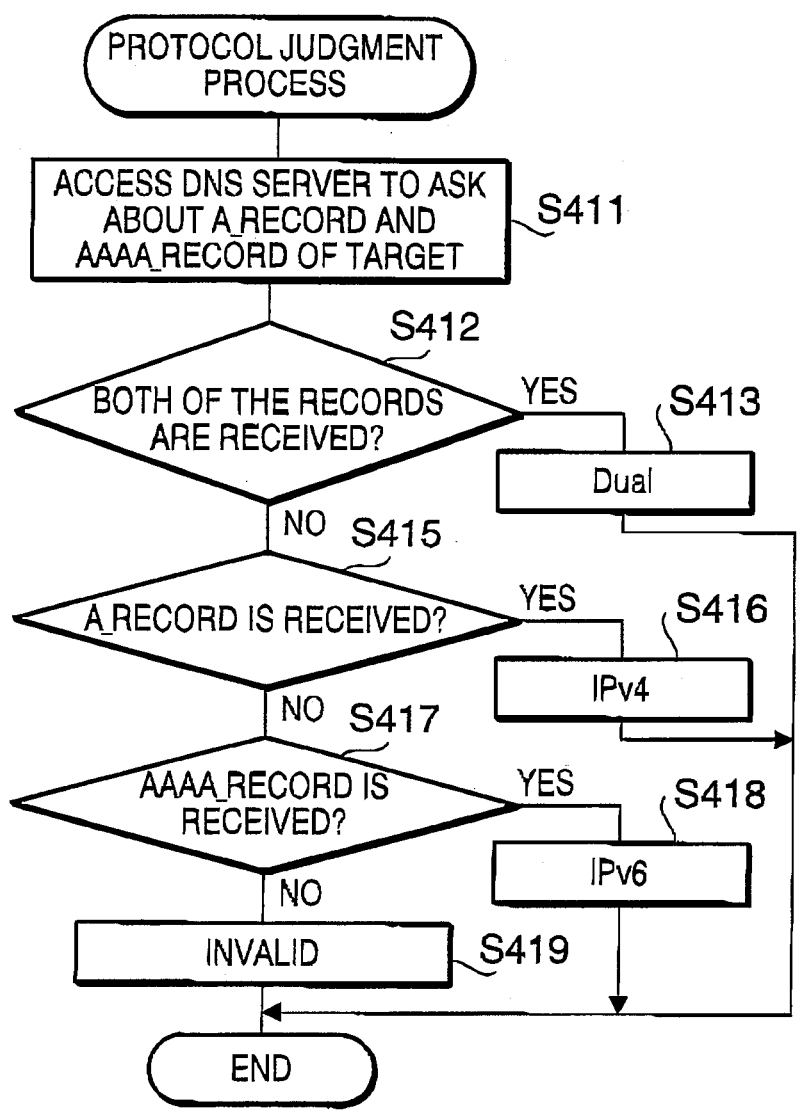
FIG. 10 is a flowchart illustrating a protocol judgment process executed in the server judgment process in accordance with aspects of the present invention.
Figure 11:
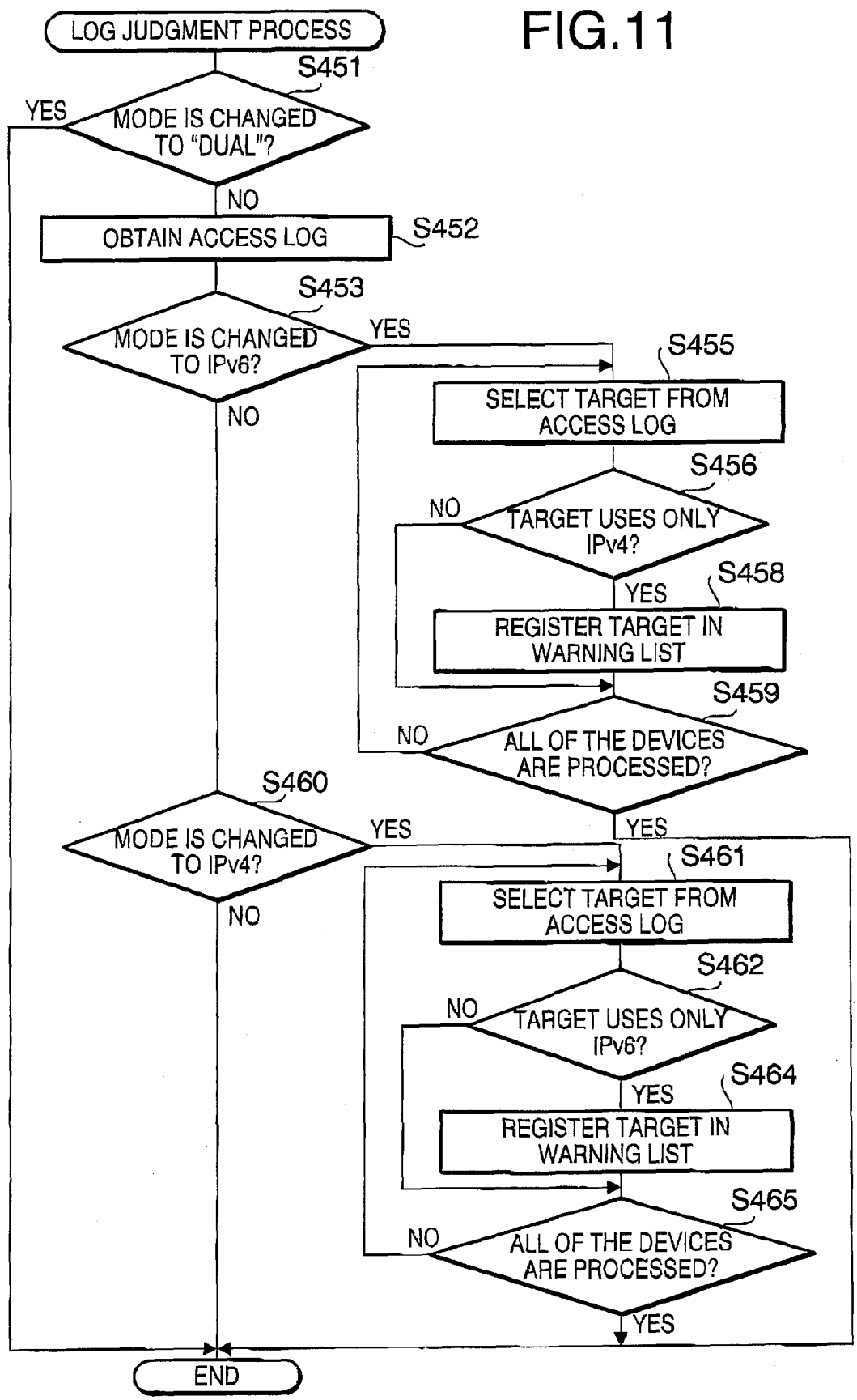
FIG. 11 is a flowchart illustrating a log judgment process executed in the protocol changing process in accordance with aspects of the present invention.

Hereafter, the protocol changing process executed in step S255 of FIG. 5 will be explained in detail. FIGS. 7 and 8 show a flowchart illustrating the protocol changing process. FIG. 9 is a flowchart illustrating a server judgment process which is executed in the protocol changing process. FIG. 10 is a flowchart illustrating a protocol judgment process executed in the server judgment process. FIG. 11 is a flowchart illustrating a log judgment process executed in the protocol changing process.

As shown in FIG. 7, firstly, the CPU 11 of the management PC displays a pull-down menu (a selection box 105) as shown in a circled portion indicated by a chain line in FIG. 6A to allow a user to select one of IP modes to be applied to the multifunction device 20 (S310). It is appreciated that other user interface items may be used as well.

By the selection box 105, the user can select one of IP modes including a "Dual mode", "IPv4 mode" and "IPv6 mode". Selecting the "Dual mode" causes the multifunction device 20 to operate using both of the IPv4 communication function and IPv6 communication function. Selecting the "IPv4 mode" causes the multifunction device 20 to operate using only the IPv4 communication function. Selecting the "IPv6 mode" causes the multifunction device 20 to operate using only the IPv6 communication function. That is, by selecting one of IP modes in the selection box 105, the On/OFF states of the IPv4 communication function and the IPv6 communication function of the multifunction device 20 can be remotely switched from the management PC.

After the selection box 105 is displayed, the CPU 11 waits until one of the IP modes is selected. If one of the IP modes is selected, the CPU 11 judges whether the IP mode is changed from a current IP mode currently set to the multifunction device 20. If the selected IP mode is equal to the current IP mode, the CPU 11 judges that the IP mode is not changed (S320: NO). In this case, the CPU 11 closes the selection box 105 (S325). Then, the protocol changing process terminates.

If it is judged in step S320 that the IP mode is changed (S320: YES), control proceeds to step S330. In step S330, the CPU 11 judges whether the management PC can continue to communicate with the multifunction device 20 if the multifunction device 20 operates in accordance with the newly selected IP mode. In other words, in step S330, the CPU 11 judges whether the CPU 11 can keep the communication with the multifunction device 20 if IP mode of the multifunction device 20 is changed.

In step S330, if the management PC is set to operate using both of the IPv4 and IPv6, the CPU 11 judges that the management PC can keep the communication with the multifunction device 20 regardless of the selected IP mode. In the case where the management PC is set to operate only using the IPv4, the CPU 11 judges that the management PC can keep the communication with the multifunction device 20 (step S330: YES) only if the selected IP mode is the "IPv4 mode" or "Dual mode", and the CPU 11 judges that the management PC can not keep the communication with the multifunction device 20 (step S330: NO) if the selected IP mode is a mode other than the "IPv4 mode" and "Dual mode". In the case where the management PC is set to operate only using the IPv6, the CPU 11 judges that the management PC can keep the communication with the multifunction device 20 (step S330: YES) only if the selected IP mode is the "IPv6 mode" or "Dual mode", and the CPU 11 judges that the management PC can not keep the communication with the multifunction device 20 (step S330: NO) if the selected IP mode is a mode other than the "IPv6 mode" and "Dual mode".

Figure 12A:
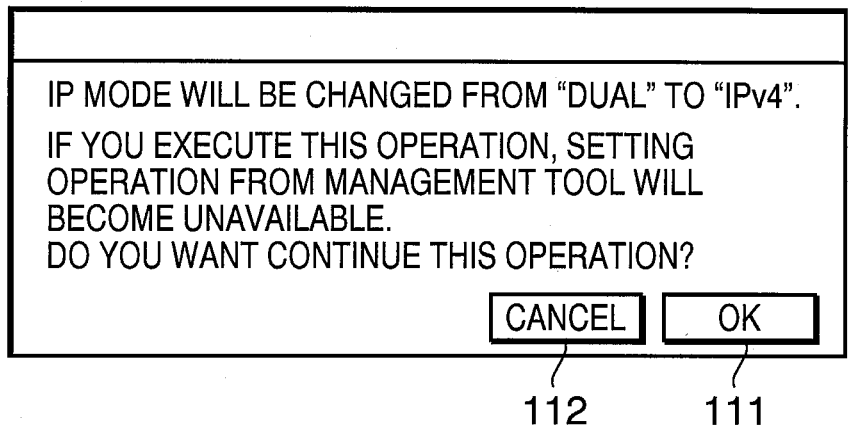
FIG. 12A shows a first example of a warning message box displayed in the protocol changing process in accordance with aspects of the present invention.

If the judgment result of step S330 is "YES", control proceeds to step S350. If the judgment result of step S330 is "NO", control proceeds to step S335 where the CPU 11 display a warning message box on the display unit 17. In the warning message box, a warning message is displayed indicating that the control of the multifunction device 20 becomes impossible by the change of the IP mode. FIG. 12A is an example of such a warning message box displayed in step S335. In the warning message box of FIG. 12A, a warning message, an "OK" button 111, and a "Cancel" button 112 are included. The "OK" button 111 is pressed if the user wants to apply the newly selected IP mode to the multifunction device 20 ignoring the warning message. The "Cancel" button 112 is pressed if the user wants to cancel a user operation performed by the user.

After displaying the warning message box in step S335, the CPU 11 waits until one of the "OK" button 111 and the "Cancel" button 112 is selected. If one of the "OK" button 111 and the "Cancel" button 112 is selected, the CPU 11 judges which of the "OK" button 11 and the "Cancel" button 112 is selected (S340). If the "Cancel" button 112 is selected (S340: NO), control proceeds to step S485 where the operation for changing the IP mode is disabled. Then, protocol changing process terminates. That is, in this case, the setting value of the IP mode in the RAM 13 is not changed.

If it is judged in step S340 that the "OK" button 111 is selected (S340: YES), control proceeds to step S350. In step S350, the CPU 11 judges whether automatic setting for automatically setting the IP address is supported in the changed IP mode. That is, since in the case of the IPv6 mode an IP address is automatically set by the IPv6 communication function, the judgment result of step S350 is "YES". On the other hand, in the case of the IPv4, the judgment result of step S350 becomes "YES" only if the setting value of "IPv4 automatic setting" stored in the RAM 13 is "enable", and the judgment result of step S350 becomes "NO" except when the setting value of "IPv4 automatic setting" stored in the RAM 13 is "enable".

Figure 12B:
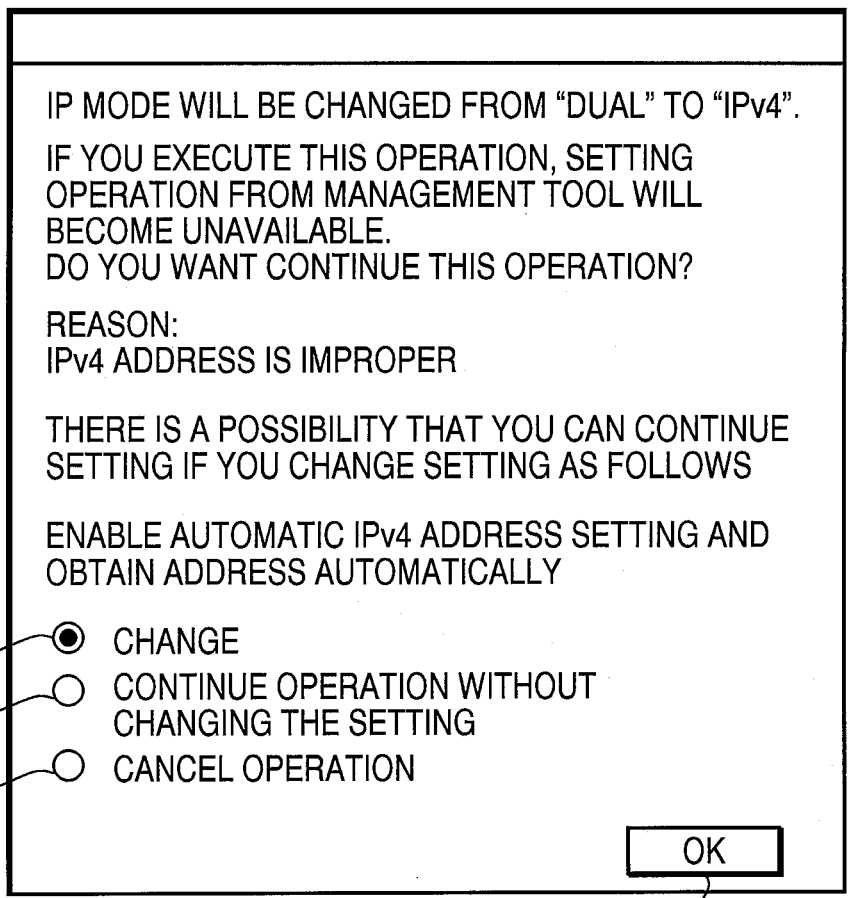
FIG. 12B shows a second example of a warning message box displayed in the protocol changing process in accordance with aspects of the present invention.

If the judgment result of step S350 is "YES", control proceeds to step S400. If the judgment result of step S350 is "NO", control proceeds to step S360. In step S360, the CPU 11 judges whether the setting value of the IPv4 address in the RAM 13 is not set. If the setting value of the IPv4 address in the RAM 13 is not set (S360: YES), control proceeds to step S365 where the CPU 11 displays a warning message box on the display unit 17. FIG. 12B is an example of such a warning message box displayed in step S365. The warning message box of FIG. 12B is configured as a graphical user interface. As shown in FIG. 12B, the warning message box includes a message indicating that setting operation using the management tool 14a will become impossible, a message indicating the reason why the setting operation using the management tool 14a will become impossible, and a message indicating solutions to this problem. For example, as one of the solutions, a message "to change the setting value so as to enable the automatic setting of IPv4 and to automatically obtain an IP address" is displayed.

Also, in the warning message box of FIG. 12B, a radio button 113a (used to obtain an instruction for changing the setting value in accordance with the solution displayed on the warning message box from the user), a radio button 113b (used to obtain an instruction for enabling an user operation ignoring the warning message from the user), and a radio button 113c (used to obtain an instruction for canceling the user operation conducted by the user) may be included. Also, the warning message box of FIG. 12B may include an "OK" button 114.

After displaying the warning message box of FIG. 12B, the CPU 11 waits until one of the radio buttons 113a, 113b and 113c is selected and then the "OK" button 114 is selected. If the "OK" button 114 is selected, the CPU 11 judges that one of the radio buttons 113a, 113b and 113c is selected, and control proceeds to step S380.

In step S380, the CPU 11 judges whether the inputted instruction is the instruction for changing the setting value. If the inputted instruction is the instruction for changing the setting value (S380: YES), the CPU 11 tentatively changes the setting value in accordance with the solution in the warning message box (S385). Specifically, in step S385, information about the changed setting value (i.e., information indicating that the setting value of the IPv4 automatic setting is to be changed to "valid") is temporarily stored, but the setting value in the RAM 13 is not changed.

If the inputted instruction is not the instruction for changing the setting value (S380: NO), control proceeds to step S390 where the CPU 11 judges whether the inputted instruction is the instruction for enabling the user operation ignoring the warning message. If the inputted instruction is the instruction for enabling the user operation ignoring the warning message (S390: YES), control proceeds to step S400. If the inputted instruction is not the instruction for enabling the user operation ignoring the warning message (S390: NO), control proceeds to step S485. In step S485, the operation for changing the IP mode is disabled. Then, the protocol changing process terminates.

Figure 13:
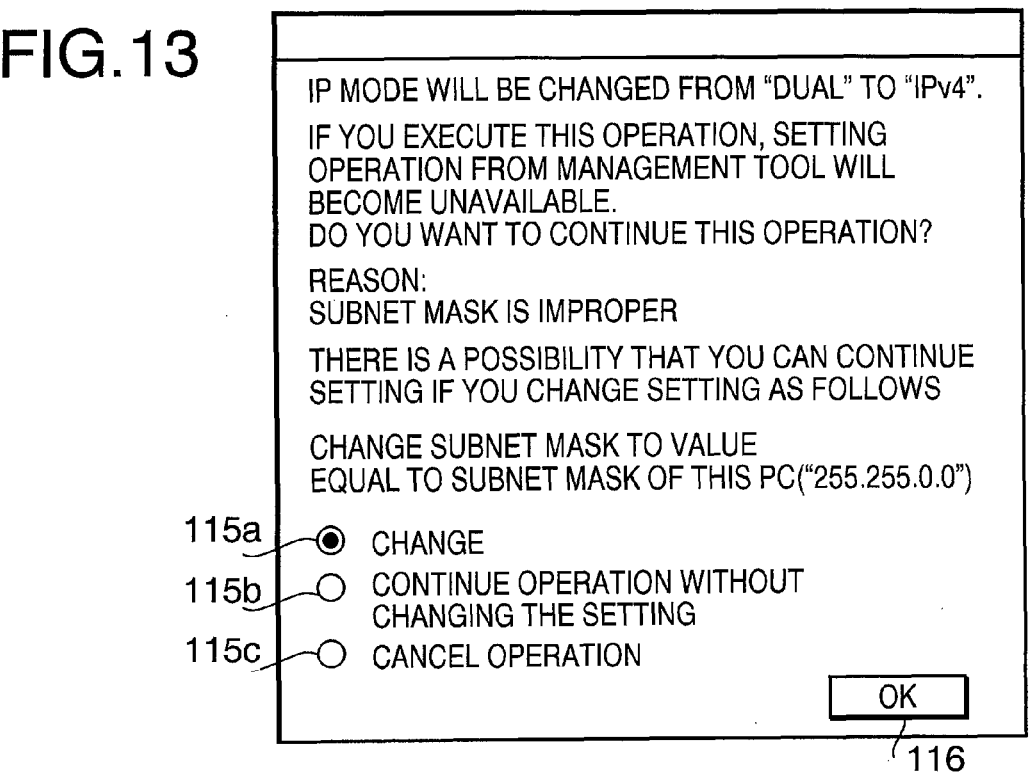
FIG. 13 shows a third example of a warning message box displayed in the protocol changing process in accordance with aspects of the present invention.

If it is judged in step S360 that the IPv4 address in the RAM 13 has been set (S360: NO), control proceeds to step S370. In step S370, the CPU 11 judges whether the setting value of the subnet mask of the IPv4 has not been set in the RAM 13. If the setting value of the subnet mask of the IPv4 has not been set (S370: YES), the CPU 11 displays a warning message box indicating that a communication error will occur because the subnet mask has not been set. FIG. 13 shows an example of such a warning message box displayed in step S375. The warning message box is configured as a graphical user interface.

As shown in FIG. 13, the warning message box includes a message indicating that setting operation by the management tool 14a will become impossible, a message asking the user whether the user wants to continue the operation, a message indicating that the reason why the setting operation by the management tool 14a will become impossible, and a message indicating solutions to this problem. For example, as one of the solutions, a message "to change the subnet mask of IPv4 to a value equal to the subnet mask of the management PC" is displayed.

Also, in the warning message box of FIG. 13, a radio button 115a (used to obtain an instruction for changing the setting value in accordance with the solution displayed on the warning message box from the user), a radio button 115b (used to obtain an instruction for enabling an user operation ignoring the warning message from the user), and a radio button 115c (used to obtain an instruction for canceling the user operation conducted by the user) may be included. Also, the warning message box of FIG. 13 may include an "OK" button 116.

After displaying the warning message box of FIG. 13, the CPU 11 waits until one of the radio buttons 115a, 115b and 115c is selected and then the "OK" button 116 is selected. If the "OK" button 116 is selected, the CPU 11 determines that one of the radio buttons 115a, 115b and 115c is selected, and control proceeds to step S380.

In step S380, the CPU 11 judges whether the inputted instruction is the instruction for changing the setting value. If the inputted instruction is the instruction for changing the setting value (S380:YES), the CPU 11 tentatively changes the setting value (i.e., the value of the subnet mask) in accordance with the solution in the warning message box (S385). Then, control proceeds to step S400.

If the inputted instruction is not the instruction for changing the setting value (S380: NO), control proceeds to step S390 where the CPU 11 judges whether the inputted instruction is the instruction for enabling the user operation ignoring the warning message. If the inputted instruction is the instruction for enabling the user operation ignoring the warning message (S390: YES), control proceeds to step S400. If the inputted instruction is not the instruction for enabling the user operation ignoring the warning message (S390: NO), control proceeds to step S485. In step S485, the operation for changing the IP mode is disabled. Then, the protocol changing process terminates.

In step S400, the CPU executes the server judgment process shown in FIG. 9. In the server judgment process, firstly, the CPU 11 judges whether the "Dual mode" has been selected as the IP mode in step S310 (S410). If the selected IP mode is the "Dual mode" (S401: YES), the server judgment process terminates.

If the selected IP mode is not the "Dual mode" (S401: NO), the CPU 11 selects a server to be subjected to the following judgment process (S403). Then, the setting data indicating an address (an IP address or a domain name) of the selected server is decided as a target for the protocol judgment process (hereafter, referred to as a protocol judgment target) (S405).

In this embodiment, one of the SMTP server, the POP server, the primary DNS server, the secondary DNS server, each of which can be accessed by the multifunction device 20, is selected as a protocol judgment target in step S403. The protocol judgment target is the address (an IP address or a domain name) of the selected server (i.e., the setting value obtained from the multifunction device 20 in step S210).

After the step S405 is finished, the CPU 11 judges whether the protocol judgment target is represented by a name (i.e., a domain name) (S407). If the protocol judgment target is not represented by a name but the protocol judgment target is represented by an IP address (S407:YES), control proceeds to step S409. In step S409, the CPU 11 judges whether the IP address as the protocol judgment target is a 32 bit IP address corresponding to IPv4 or a 128 bit IP address corresponding to IPv6. In other words, the CPU 11 judges whether a communication protocol of the selected server is IPv4 or IPv6. Then, control proceeds to step S420.

If it is judged in step S407 that the protocol judgment target is the domain name (S407: YES), the CPU 11 executes the protocol judgment process shown in FIG. 10 (S410).

Referring now to FIG. 10, in step S411, the CPU 11 accesses the DNS server 31 on the network NL to ask about an A record and AAAA record regarding the domain name of the selected server (S411). The A record represents an IPv4 address (IP address) corresponding to the domain name. The AAAA record represents an IPv6 address (IP address) corresponding to the domain name.

When the DNS server 31 receives the inquiry about the A record, the DNS server 31 checks whether the A record corresponding to the asked domain name is recorded in the DNS server 31. If the A record corresponding to the asked domain name is recorded in the DNS server 31, the DNS server 31 sends the A record back to the management PC. If the A record corresponding to the asked domain name is not recorded in the DNS server 31, the DNS server 31 sends no response. When the DNS server 31 receives the inquiry about the AAAA record, the DNS server 31 checks whether the AAAA record corresponding to the asked domain name is recorded in the DNS server 31. If the AAAA record corresponding to the asked domain name is recorded in the DNS server 31, the DNS server 31 sends the AAAA record back to the management PC. If the AAAA record corresponding to the asked domain name is not recorded in the DNS server 31, the DNS server 31 sends no response.

After the step S411 is finished, the CPU 11 waits for a certain period of time. Then, in step S412, the CPU 11 judges whether both of the A record and the AAAA record have been received through the network interface 16 as a response to the inquiry sent in step S411. If both of the A record and the AAAA record have been received (S412: YES), the CPU 11 judges that the communication protocol of the selected server is "Dual mode" (i.e., both of the IPv4 and the IPv6 are supported). Then, the protocol judgment process terminates.

If the A record and the AAAA record have not been received at all (S412: NO), control proceeds to step S415 where the CPU 11 judges whether the A record has been received (S415). If the A record has been received (S415: YES), the CPU 11 judges that the communication protocol of the selected server is the IPv4 (S416). Then, the protocol judgment process terminates.

If the A record has not been received (S415: NO), the CPU 11 judges whether the AAAA record has been received (S417). If the AAAA record has been received (S417: YES), the CPU 11 judges that the communication protocol of the selected server is the IPv6 (S418). Then, the protocol judgment process terminates. If the AAAA record has not been received (S417: NO), the CPU 11 determines that the asked domain name is invalid because the CPU 11 has not been received the A record and the AAAA record at all. Then, the protocol judgment process terminates.

Referring now to FIG. 9, after the protocol judgment process terminates, control proceeds to step S420. In step S420, the CPU 11 judges whether the selected IP mode (selected in step S310 of FIG. 7) is IPv6 mode. If the selected IP mode is the IPv6 mode, the CPU 11 judges whether the selected server can perform data communication by IPv6 based on the judgment result of the protocol judgment process (S421). If the selected server can perform data communication by IPv6 (S421: YES), control proceeds to step S430. If the selected server cannot perform data communication by IPv6 (S421: NO), for example, due to the fact that the communication protocol of the selected server is IPv4, the CPU 11 records information of the selected server in a warning list which is stored in the RAM 13 (S423). The information of the selected server recorded in the warning list is displayed later on a warning message box.

After the step S423 is finished, control proceeds to step S430. It should be noted that the warning list may be created in the RAM 13 as blank data each time the server judgment process is executed.

On the other hand, if it is judged in step S420 that the selected IP mode is not the IPv6 (S420: NO), the CPU 11 judges whether the selected IP mode is the IPv4 mode (S425). If the selected IP mode is not the IPv4 mode (S425: NO), control proceeds to step S430. If the selected IP mode is the IPv4 mode (S425: YES), the CPU 11 judges whether the selected server can perform data communication by IPv4 based on the judgment result of the protocol judgment process (S427).

If the selected server can perform data communication by IPv4 (S427: YES), control proceeds to step S430. If the selected server can not perform data communication by IPv4

(S427: NO), for example, due to the fact that the communication protocol of the selected server is IPv6, the CPU 11 records information of the selected server in the warning list which is stored in the RAM 13 (S429). The information of the selected server in the warning list is displayed later on a warning message box. Then, control proceeds to step S430.

In step S430, the CPU 11 judges whether a series of steps of S405 to S429 is executed for all of the servers to be judged. If all of the servers have not been processed (S430: NO), the CPU 11 selects a next server (S431). Then, control returns to step S405.

If all of the servers have been processed (S430: YES), the server judgment process terminates.

Referring now to FIG. 7, after the server judgment process (S400) is finished, the CPU 11 judges whether the multifunction device 20 can communicate with the server to be accessed if the multifunction device 20 operates based on the changed IP mode (S435). The judgment in step S435 is carried out based on the judgment result of the server judgment process. Specifically, if the server information is recorded in the warning list, at least one of the servers will become unable to communicate with the multifunction device 20. Therefore, in this case, the judgment result of step S435 becomes "NO".

If the server information is not recorded in the warning list at all, all of the servers can communicate with the multifunction device 20. Therefore, in this case, the judgment result of step S435 becomes "YES".

Figure 14A:
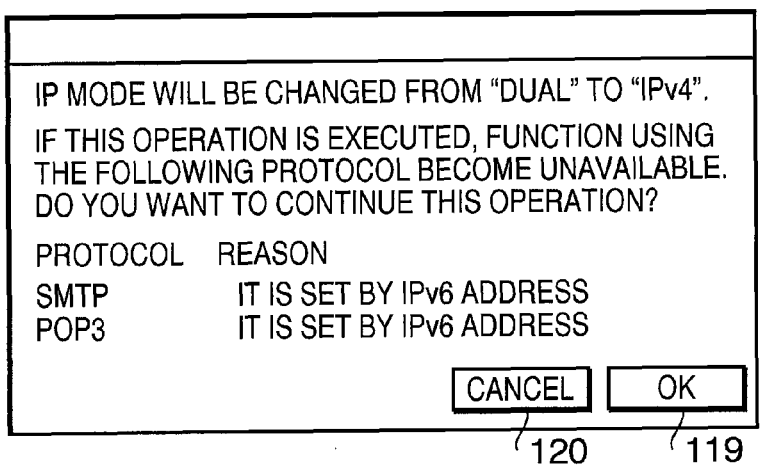
FIG. 14A is a fourth example of a warning message box displayed in the protocol changing process in accordance with aspects of the present invention.

If the judgment result of step S435 is "YES", control proceeds to step S450. If the judgment result of step S435 is "NO", the CPU 11 of the management PC displays a warning message box indicating that the changed IP mode does not match with the setting of the server because in this case communication between the multifunction device 20 and the server will become unsuccessful (S440). FIG. 14A is an example of such a warning message box displayed in step S440. The warning message box is configured as a graphical user interface.

As shown in FIG. 14A, the warning message box includes a message indicating that there is a protocol (a server) that will become unusable, a message asking the user whether to continue the operation, and a message indicating a list of protocols (servers) that will become unusable. Also, the warning message box of FIG. 14A includes an "OK" button 119, and a "Cancel" button 120. The "OK" button 119 is pressed if the user wants to enable the user operation ignoring the warning message. The "Cancel" button 120 is pressed if the user wants to cancel the user operation.

After displaying the warning message box of FIG. 12A in step S440, the CPU 11 waits until one of the "OK" button 119 and the "Cancel" button 120 is selected. If one of the "OK" button 119 and the "Cancel" button 120 is selected, the CPU 11 judges whether the pressed button the "OK" button 119 or the "Cancel" button 120 (S445). If the pressed button is the "Cancel" button (S445: NO), control proceeds to step S485 where the changing operation of the IP mode is disabled. Then, the protocol changing process terminates. If the "OK" button 119 is pressed (S445: YES), control proceeds to step S450 where the CPU 11 executes the log judgment process.

Hereafter, the log judgment process is explained with reference to FIG. 11. As shown in FIG. 11, firstly, the CPU 11 of the management PC judges whether the selected IP mode selected in step S310 of FIG. 7 is "Dual mode". If the selected IP mode us the "Dual mode" (S451: YES), the log judgment process terminates.

If it is judged in step S451 that the selected IP mode is not the "Dual mode" (S451: NO), control proceeds to step S452 where the CPU 11 obtains an access log from the multifunction device 20 through the network interface 16. Then, the CPU 11 judges whether the selected IP mode is the "IPv6 mode" (S453). If the selected IP mode is the "IPv6 mode" (S453: YES), control proceeds to step S455.

In step S455, the CPU 11 selects a source device (an address judgment target device) to be subjected to the following address judgment from among devices in the access log. Then, the CPU 11 judges whether the address judgment target device accessed the multifunction device 20 only using the IPv4 (S456). Specifically, in step S456, the CPU 11 analyses the communication history information of the same node (node name) and judges whether all of the IP addresses of the address judgment target device recorded in the access log are the IPv4 address. If the IP addresses of the address judgment target device in the access log include the IPv6 address, then the judgment result of step S456 becomes "NO". If all of the IP addresses of the address judgment target device in the access log are the IPv4 address, then the judgment result of step S456 becomes "YES".

If the judgment result of step S456 is "NO", control proceeds to step S459. If the judgment result of step S456 is "YES", the CPU 11 records the node name and the IP address of the address judgment target device in a warning list (which is different from the warning list used in the server judgment process shown in FIG. 9) stored in the RAM 13 so that information of the address judgment target device will be displayed in the warning message box (S458). Then, control proceeds to step S459. The warning list may be created in the RAM 13 as blank data each time the log judgment process is executed.

In step S459, the CPU 11 judges whether all of the nodes in the access log have been subjected to the steps of S455 to S458. If all of the nodes in the access log have not been processed (S459: NO), control returns to step S455. If all of the nodes in the access log have been processed (S459: YES), the log judgment process terminates.

If it is judged in step S453 that the selected IP mode is not the IPv6 mode (S453: NO), control proceeds to step S460. In step S460, the CPU 11 judges whether the selected IP mode is the IPv4 mode. If the selected mode is the IPv4 mode (S460: YES), control proceeds to step S461.

In step S461, the CPU 11 selects a source device (an address judgment target device) to be subjected to the following address judgment from among devices in the access log. Then, the CPU 11 judges whether the address judgment target device accessed the multifunction device 20 only using the IPv6 (S462). Specifically, in step S462, the CPU 11 analyses the communication history information of the same node (node name) and judges whether all of the IP addresses of the address judgment target device recorded in the access log are the IPv6 address. If the IP addresses of the address judgment target device in the access log include the IPv4 address, then the judgment result of step S462 becomes "NO". If all of the IP addresses of the address judgment target device in the access log are the IPv6 address, then the judgment result of step S462 becomes "YES".

If the judgment result of step S462 is "NO", control proceeds to step S465. If the judgment result of step S462 is "YES", the CPU 11 records the node name and the IP address of the address judgment target device in a warning list stored in the RAM 13 so that information of the address judgment target device will be displayed in the warning message box (S464). Then, control proceeds to step S465.

In step S465, the CPU 11 judges whether all of the nodes in the access log have been subjected to the steps of S461 to S464. If all of the nodes in the access log have not been processed (S465: NO), control returns to step S461. If all of the nodes in the access log have been processed (S465: YES), the log judgment process terminates.

Refereeing now to FIGS. 7 and 8, after the log judgment process is finished, control proceeds to step S470. In step S470, the CPU 11 of the management PC judges whether a device, which will become unable to communicate with the multifunction device 20 if the selected IP mode is applied to the multifunction device 20, exists in the access log based on the result of the log judgment process of FIG. 11. Specifically, in step S470, the CPU 11 judges whether a node name (or an IP address), which does not support the selected IP mode to be applied to the multifunction device 20, exists in the warning list updated in the log judgment process of FIG. 11. If a node name (or an IP address) exists in the warning list, the judgment result of step S470 becomes "YES" because in this case there is a device that will become unable to communicate with the multifunction device.

Figure 14B:
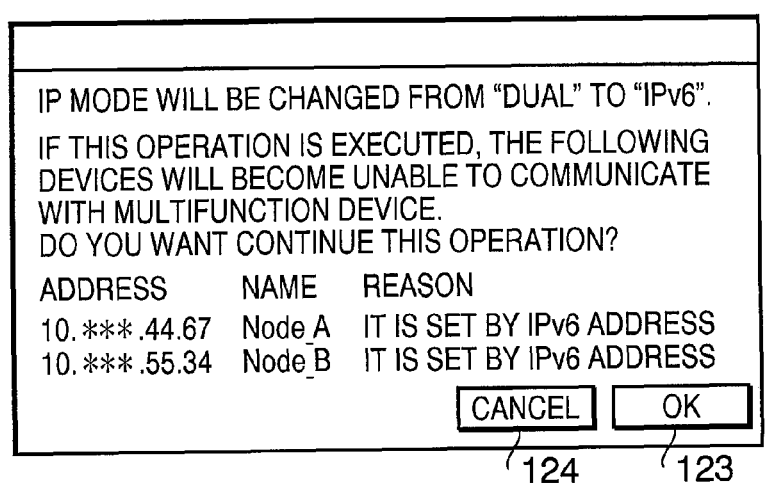
FIG. 14B is a fifth example of a warning message box displayed in the protocol changing process in accordance with aspects of the present invention.

If the warning list is empty, the judgment result of step S470 becomes "NO". If the judgment result of step S470 is "NO", control proceeds to step S490. If the judgment result of step S470 is "YES", control proceeds to step S475. In step S475, the CPU 11 displays a warning message box including a message indicating that there is a device, which is now able to communicate with the multifunction device 20, will become unable to communicate with the multifunction device 20. FIG. 14B is an example of such a warning message box displayed in step S475. The warning message box is configured as a graphical user interface.

As shown in FIG. 14B, the warning message box includes a message indicating that there is a device that will become unable to communicate with the multifunction device 20, a message asking the user whether to continue the operation, and a message indicating IP addresses and node names of the devices that will become unable to communicate with the multifunction device 20. Also, the warning message box of FIG. 14B includes an "OK" button 123, and a "Cancel" button 124.

After displaying the warning message box in step S475, the CPU 11 waits until one of the "OK" button 123 and the "Cancel" button 124 is selected. If one of the "OK" button 123 and the "Cancel" button 124 is selected, the CPU judges whether a selected button is the "OK" button 123 or the "Cancel" button 124 (S480). If the selected button is the "Cancel" button 124 (D480: NO), control proceeds to step S485 where the changing operation for the IP mode is disabled. Then, the protocol changing process terminates.

If it is judged that the "OK" button is pressed (S480: YES), control proceeds to step S490 where the setting value of the IP mode stored in the RAM 13 is changed to the value of the selected IP mode selected in step S310 of FIG. 7. In step S490, if the temporarily stored data exists in the RAM 13, the setting value in the RAM 13 may be changed by using the temporarily stored data.

For example, if an instruction for changing the setting value in accordance with the solution displayed on the warning message box shown in FIG. 12B by the step S365 is inputted by the user, the setting value of "the IPv4 automatic setting" is set to a valid state in step S490. Also, if an instruction for changing the setting value in accordance with the solution displayed on the warning message box shown in FIG. 13 by the step S375 is inputted by the user, the value of the subnet mask stored in the RAM 13 is changed to a value equal to the value of the subnet mask of the management PC.

Also, in step S490, the setting data displayed in the setting screen 101 is updated so that the changed setting data is applied to the setting screen 101. After the step S490 is finished, the protocol changing process terminates.

Figure 15:
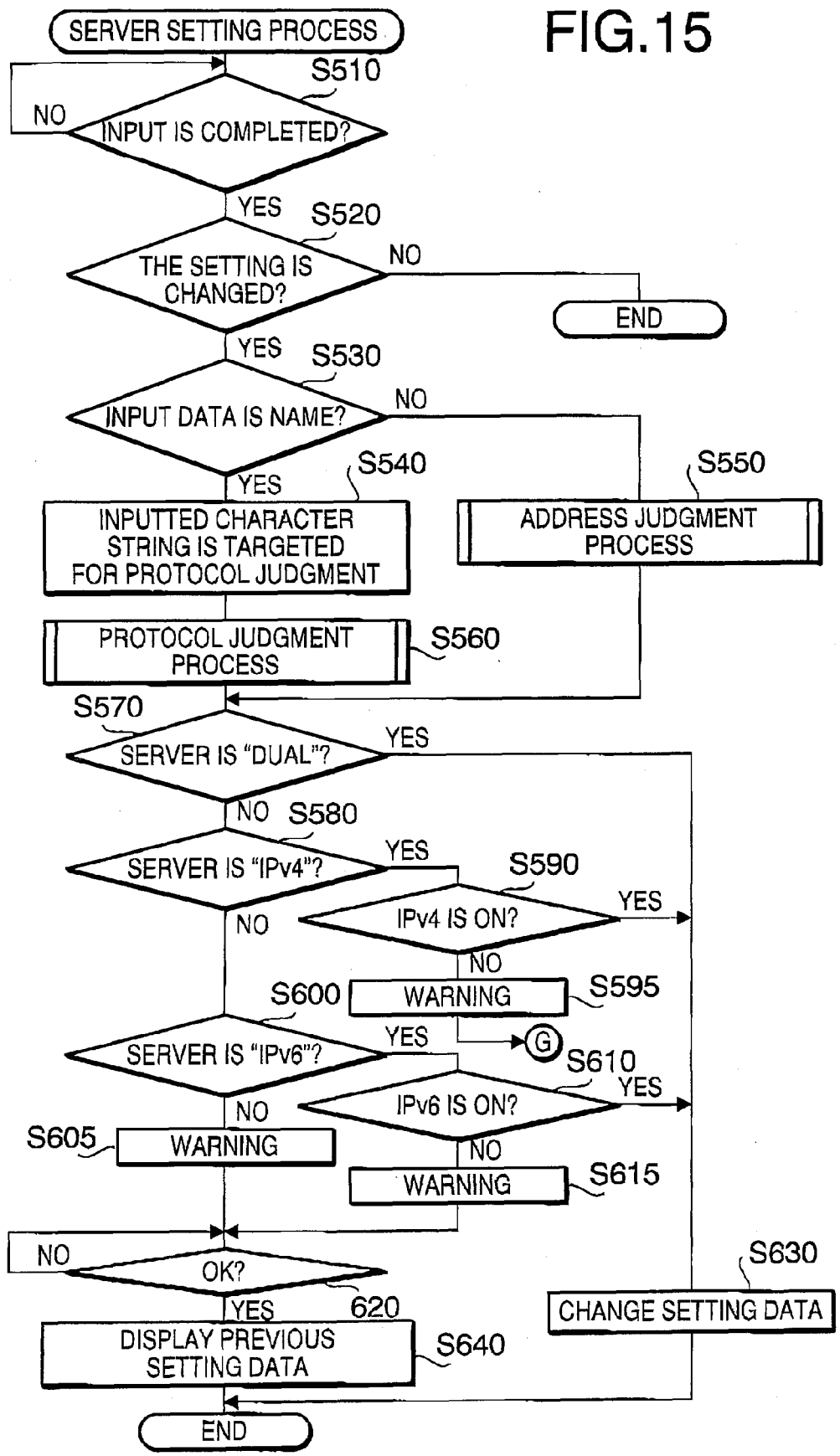
FIG. 15 is a flowchart illustrating a server setting process in accordance with aspects of the present invention.

Next, the server setting process executed in step S265 of FIG. 5 will be explained with reference to FIG. 15. As shown in FIG. 15, firstly, the CPU 11 of the management PC waits until a character string inputting operation (for inputting a character string in an inputting field), which causes the execution of the server setting process, is completed (S510: NO). If it is judged that the inputting operation is completed (S510: YES), control proceeds to step S520. In step S510, the CPU 11 may judge that the inputting operation is completed if another inputting field, which is different from the inputting field causing the execution of server setting process, is selected by the user.

In step S520, the CPU 11 of the management PC judges whether the value of the inputting field is changed by the inputting operation detected in step S510. That is, in step S520, the CPU 11 judges whether the inputted setting value inputted by the user is different from the setting value previously set to the inputting field. If the setting value is not changed by the inputting operation (S520: NO), the server setting process terminates.

If the setting value is changed by the inputting operation (S520: YES), the CPU 11 judges whether the character string inputted to the inputting field is a domain name (S530). If the character string inputted to the inputting field is a domain name (S530: YES), the domain name inputted to the inputting field is targeted for the protocol judgment process (S540). Then, the protocol judgment process of FIG. 10 (which has been already explained with reference to FIG. 5) is executed in step S560. After the step S560 is finished, control proceeds to step S570.

Figure 16:
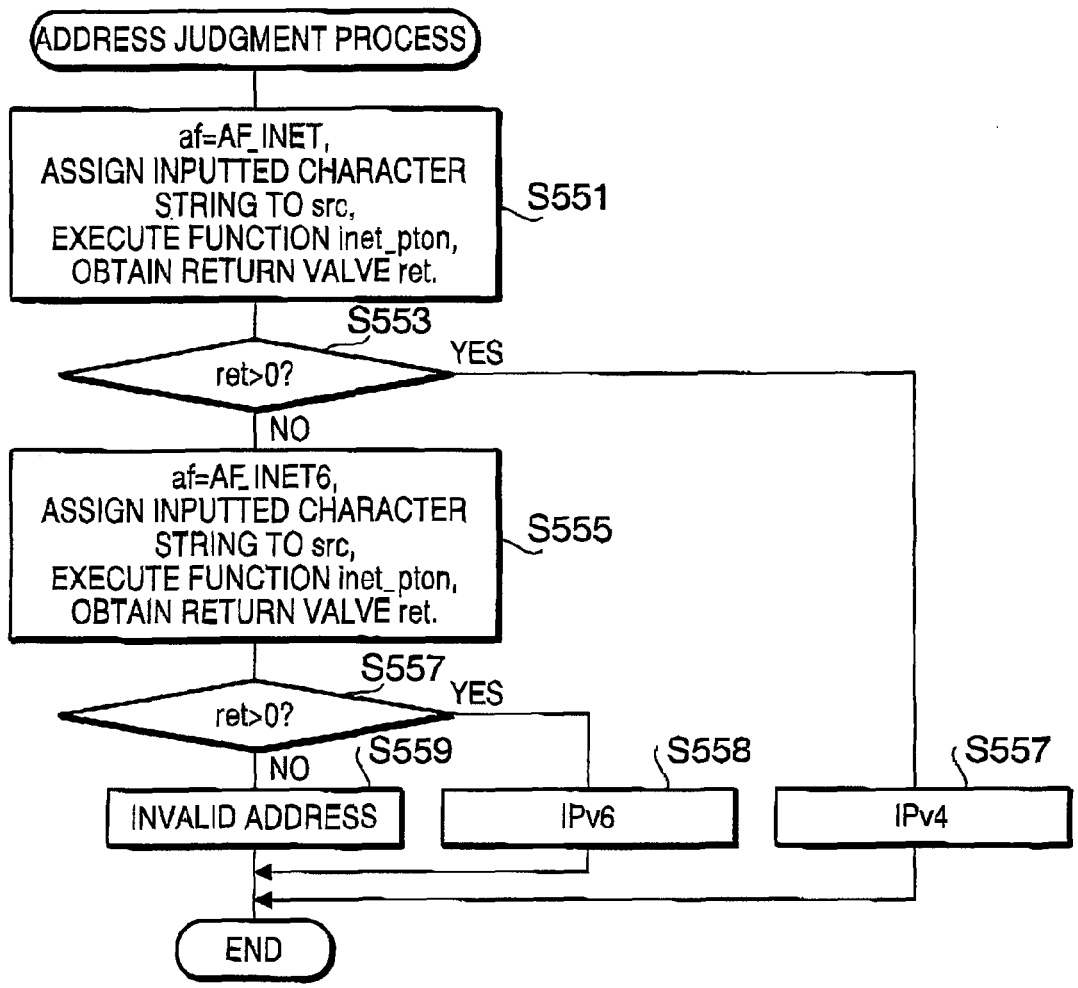
FIG. 16 is a flowchart illustrating an address judgment process executed in the server setting process in accordance with aspects of the present invention.

If the inputted character string is not a domain name but an IP address (S530: NO), control proceeds to step S550 where an address judgment process is executed. FIG. 16 is a flowchart illustrating the address judgment process. Hereafter, the address judgment process will be explained.

In the address judgment process, a function inet_pton(int af,const char *src,void *dst), which is a function generally used in the existing network, is used to judge the inputted IP address.

The function inter_pton changes the character string src to a network address structure of an address family af and copy it to a variable dst. If data, which is not supported by the address family af, is set to the character string src, the function returns a negative value as a return value ret. If an appropriate address is set to the character string src, the function returns a positive value as a return value ret.

In the case where a value AF_INET is set to the address family af and the function is executed, a value smaller than or equal to zero is obtained as the return value ret if the character string src is not an appropriate IP address of IPv4. On the other hand, if the character string src is not an appropriate IPv4 address, a value of zero is obtained as a return value ret.

Alternative to using the function inter_pton, an address judgment regarding the IPv4 address may be executed according to the following judgment rules.
1) Starting from, for example, a leftmost character in the character string src, the CPU 11 judges whether a targeted character is a decimal character, and if a targeted character is a decimal character, the CPU 11 continues the judgment until a period appears in the character string src.
2) Then, the CPU 11 converts the decimal characters, which are obtained before a period appears, to a numeric value.
3) If the numeric value obtained by the above step 2) exceeds 255, the CPU 11 judges that the target IPv4 address (the inputted character string) is inappropriate.

The above steps 1) to 3) are repeated until a character other than a decimal character and a period appears in the character string src, and the CPU generates and outputs the return value.

In the case where a value AF_INET6 is set to the address family of and the function is executed, a value smaller than or equal to zero is obtained as the return value ret if the character string src is not an appropriate IP address of IPv6. On the other hand, if the character string src is not an appropriate IPv6 address, a value of zero is obtained as a return value ret.

Alternative to using the function inter_pton, an address judgment regarding the IPv6 address may be executed according to the following judgment rules.

1) Starting from, for example, a leftmost character in the character string src, the CPU 11 judges whether a targeted character is a hexadecimal character, and if a targeted character is a hexadecimal character, the CPU 11 continues the judgment until a colon appears in the character string src.
2) Then, the CPU 11 converts the hexadecimal characters, which are obtained before a colon appears, to a numeric value.
3) If the numeric value obtained by the above step 2) exceeds 0xffff, the CPU 11 judges that the target IPv6 address (the inputted character string) is inappropriate.
4) If a character string "::" appears in the character string src, the CPU 11 stores a position of the "::". Further, if the CPU 11 finds a character string "::" again (i.e., a second "::" appears in the character string src), the CPU 111 judges that the target address (the inputted character string) is inappropriate.

The above steps 1) to 4) are repeated until a character other than a hexadecimal character and a colon appears in the character string src. Further, if the position of the "::" is stored, the CPU 11 inserts a numeric value of 0 into the position. Then the CPU generates and outputs the return value.

In the address judgment process of FIG. 16, the function which outputs the return value as mentioned above is used to judge which of an IPv4 address, an IPv6 address and an wrong address (for example, caused by mistyping) the inputted character string is.

As shown in FIG. 16, in step S551, the CPU 11 assigns "AF_NET" to the variable af (af=AF_INET), assigns the inputted character string inputted to the inputting field to the variable src, and then executes the function inet_pton to obtain a return value ret. Next, the CPU 11 judges whether or not the return value ret obtained in step S551 is a positive value (S553).

If the return value ret is a positive value (S553: YES), the CPU 11 judges that the inputted IP address is an IPv4 address and therefore the communication protocol of the server corresponding to the inputting field is the IPv4 (S557). Then, the address judgment process terminates.

If it is judged in step S553 that the return value ret is not the positive value (S553: NO), the CPU 11 assigns "AF_INET6" to the variable af (af=AF_INET6) and assigns the inputted character string to the variable src, and then executes the function inet_pton to obtain a return value ret (S555). Next, the CPU 11 judges whether or not the return value ret obtained in step S551 is a positive value (S556).

If the return value ret is a positive value (S556: YES), the CPU 11 judges that the inputted IP address is an IPv6 address and therefore the communication protocol of the server corresponding to the inputting field is the IPv6 (S558). Then, the address judgment process terminates.

If it is judged in step S556 that the return value ret is not the positive value (S556: NO), the CPU 11 judges the inputted address to be a wrong address. Then, the address judgment process terminates (S559).

Referring now to FIG. 15, after the address judgment process is finished, control proceeds to step S570. In step S570, the CPU 11 of the management PC judges whether the server corresponding to the inputting field is a device capable of using both of the IPv4 and the IIPv6. In step S570, the CPU 11 judges that the server corresponding to the inputting field is a device capable of using both of the IPv4 and the IIPv6 only if the result of the protocol judgment process is the "Dual mode".

If the result of the judgment in step S570 is "YES", the CPU 11 changes the setting value of the server corresponding to the inputting field stored in the RAM 13 to the character string inputted to the inputting field (S630). Then, the server setting process terminates.

If the result of the judgment in step S570 is "NO", the CPU 11 judges whether the communication protocol of the server corresponding to the inputting field is the IPv4 based on the result of the protocol judgment process or the address judgment process (S580). If the communication protocol is the IPv4 (S580: YES), control proceeds to step S590. In step S590, the CPU 11 judges whether the IPv4 communication function of the multifunction device 20 is ON based on the setting value stored in the RAM 13. In step S590, the CPU 11 judges that the IPv4 communication function is ON if the setting value of the IP mode is the "Dual mode" or the "IPv4 mode".

If it is judged that the IPv4 communication function is ON (S590: YES), control proceeds to step S630 where the CPU 11 changes the setting value of the server corresponding to the inputting field, which causes the execution of the server setting process, to the character string inputted to the inputting field. Then, the server setting process terminates.

If it is judged that the IPv4 communication function is OFF (S590: NO), the CPU 11 displays an warning message box, for requesting the user to input an appropriate IP address matching with the current IP mode, on the display unit 17 (S595). For example, if a server address is changed from an IPv6 address to an IPv4 address despite the fact that the current IP mode is IPv6 (i.e., the IPv4 communication function is OFF), the warning message box is displayed in step S595. FIG. 17A is an example of such a warning message box. As shown in FIG. 17A, the warning message box includes a message requesting the user to input an appropriate IP address matching with the current IP mode, and an "OK" button 130.

After the warning message box of FIG. 17A is displayed, the CPU 11 waits until the "OK" button 130 is pressed by the user through use of the inputting device 18 (S620: NO). If the "OK" button 130 is pressed (S620: YES), the CPU 11 deletes the character string inputted to the inputting field in step S510, and displays a previous address previously set to the inputting field on the inputting field (S640). Since the previous address is stored in the RAM 13, the previous address to be displayed can be obtained from the RAM 13. After the step S640, the server setting process terminates.

If it is judged in step S580 that the communication protocol is the IPv4 (S580: NO), the CPU 11 judges whether the communication protocol of the server corresponding to the inputting field is the IPv6 based on the result of the protocol judgment process or the address judgment process (S600). If the communication protocol is the IPv6 (S600: YES), control proceeds to step S610. In step S610, the CPU 11 judges whether the IPv6 communication function of the multifunction device 20 is ON based on the setting value stored in the RAM 13. In step S610, the CPU 11 judges that the IPv6 communication function is ON if the setting value of the IP mode is the "Dual mode" or the "IPv6 mode".

If it is judged that the IPv6 communication function is ON (S610: YES), control proceeds to step S630 where the CPU 11 changes the setting value of the server corresponding to the inputting field, which causes the execution of the server setting process, to the character string inputted to the inputting field. Then, the server setting process terminates.

If it is judged that the IPv6 communication function is OFF (S610: NO), the CPU 11 displays an warning message box, for requesting the user to input an appropriate IP address matching with the current IP mode, on the display unit 17 (S615). For example, if a server address is changed from an IPv4 address to an IPv6 address despite the fact that the current IP mode is IPv4 (i.e., the IPv6 communication function is OFF), the warning message box is displayed in step S595. FIG. 17B is an example of such a warning message box. As shown in FIG. 17B, the warning message box includes a message requesting the user to input an appropriate IP address matching with the current IP mode, and an "OK" button 132.

After the warning message box of FIG. 17B is displayed, the CPU 11 waits until the "OK" button 132 is pressed by the user through use of the inputting device 18 (S620: NO). If the "OK" button 130 is pressed (S620: YES), the CPU 11 deletes the character string inputted to the inputting field in step S510, and displays a previous address previously set to the inputting field on the inputting field. Since the previous address is stored in the RAM 13, the previous address to be displayed can be obtained from the RAM 13. After the step S640, the server setting process terminates.

If it is judged in step S600 that the IP mode of the server is not the IPv6 mode (S600: NO), the CPU 11 displays an warning message box (not shown), including a message for requesting the user to input an appropriate IP address matching with the current IP mode and an "OK" button, on the display device 17 (S605). Then, the CPU 11 waits until the "OK" button is pressed by the user through use of the inputting device 18 (S620: NO). If the "OK" button is pressed (S620: YES), the CPU 11 deletes the character string inputted to the inputting field in step S510, and displays a previous address previously set to the inputting field on the inputting field. Since the previous address is stored in the RAM 13, the previous address to be displayed can be obtained from the RAM 13. After the step S640, the server setting process terminates.

Referring now to FIG. 5, after the server setting process of step S265 is finished, control returns to step S230. As described above, if the "OK" button 130 displayed on the setting screen 101 is selected, the changed setting data is applied to the multifunction device 20 (S275). That is, the setting values edited by the user through use of the setting screen (i.e., the setting operation for setting server addresses and the changing operation for changing the IP mode) are transmitted to the multifunction device 20.

That is, the setting value in the RAM 13 changed based on the operation for changing the IP mode is applied to the setting value stored in the NVRAM 24 of the multifunction device 20, and thereby the IPv4 communication function and the IPv6 communication function of the multifunction device 20 is switched to ON or OFF.

Also, the setting value in the RAM 13 changed based on the operation for changing a server address is applied to the setting value stored in the NVRAM 24 of the multifunction device 20, and thereby the setting value of the server address in the multifunction device 20 is updated. Therefore, the multifunction device 20 can access the server corresponding to the updated server address.

As described above, the management PC remotely controls the setting values of the multifunction device 20 in accordance with the user operation conducted by the user through use of the inputting device 18. The communication between the management PC and the multifunction device 20 is executed based on the SNMP. Also, before the management PC applies the changed setting values to the multifunction device 20, the management PC judges whether the multifunction device 20 can continue to communicate with a device, which the multifunction device 20 communicated with using the previous setting values, if the multifunction device 20 operates in accordance with the changed setting values. That is, before the changed setting values are applied to the multifunction device 20, the management PC judges whether a problem occurs in the future communication in which the multifunction device 20 uses the changed setting values.

If the management PC judges that a problem occurs in the future communication in which the multifunction device 20 is involved, the management PC cancels the user operation (see S485 of FIG. 8) so that the changed setting values are not applied to the multifunction device 20. That is, in this case the management PC inhibits the change of the setting values.

With this configuration, it becomes possible to prevent the occurrence of a communication error which is caused if wrong setting values are set to the multifunction device 20.

The occurrence of a trouble in communication in which the multifunction device 20 is involved is prevented. For example, the occurrence of the trouble in communication between a certain device (e.g., a DNS server, a mail server, a gateway, a router, and an access point) and the multifunction device is prevented.

If the communication between the management PC and the multifunction device 20 becomes impossible, the user can be terribly inconvenienced because the user uses the management PC to remotely change the setting values of the multifunction device 20 through the network NL. In this regard, before the changed setting values are applied to the multifunction device 20, the management PC judges whether the management PC can continue to communicate with the multifunction device 20 if the multifunction device 20 operates in accordance with the changed setting values. If the management PC judges that the communication can not be maintained (S330: NO), the management PC cancels the use operation (S485), so that the changed setting values are not applied to the multifunction device 20. Therefore, communication is prevented that renders the interaction between the management PC and the multifunction device impossible.

In this embodiment, each of the IPv4 communication function and the IPv6 communication function can be switched to ON or OFF. Further, in the protocol changing process, before the ON/OFF state of one of the IPv4 communication function and the IPv6 communication function is changed, the CPU 11 judges whether trouble arises in the communication, in which the multifunction device 20 is involved, if the changed setting values are applied to the multifunction device 20. Therefore, according to the embodiment, the trouble is prevented that may otherwise arise in the communication if the ON/OFF state of one of the IPv4 communication function and the IPv6 communication function is changed.

In this embodiment, the multifunction device 20 is configured to generate the access log in which information about the communication protocols (e.g., IP addresses) of devices which communicated with the multifunction device 20 is recorded. Further, the access log is updated so that the file size of the access log does not exceed the predetermined size. In the log judgment process, the CPU 11 judges whether a device, which will become unable to communicate with the multifunction device 20, exists in the devices stored in the access log if the changed setting values are applied to the multifunction device 20. If the CPU 11 judges that a device, which will become unable to communicate with the multifunction device 20, exists (S470: YES), the CPU 11 disables the user operation for changing the IP mode. Therefore, according to the embodiment, the devices, which frequently communicate with the multifunction device 20, are protected from being modified to the extend that communication is made impossible the multifunction device 20 if the changed setting values are applied to the multifunction device 20.

In this embodiment, the multifunction device 20 is configured such that each of the IPv4 communication function and the IPv6 communication function can be switched to ON or OFF, and that only a single address can be set to each of the servers (e.g., the SMTP server). Therefore, there is a possibility that inconsistency arises between the changed server address and the state of the IPv4 and IPv6 communication functions.

For this reason, in this embodiment, if the CPU 11 judges that the server address stored in the multifunction device 20 is the IPv4 address despite the fact that the changed IP mode is the IPv6 mode (S421: NO), the CPU 11 judges that a trouble will arise in the communication (S435: NO) and therefore the CPU 11 inhibits the change of the setting value (S485). Also, if the CPU 11 judges that the server address stored in the multifunction device 20 is the IPv6 address despite the fact that the changed IP mode is the IPv4 mode (S427: NO), the CPU 11 judges that a trouble will arise in the communication (S435: NO) and therefore the CPU 11 inhibits the change of the setting value (S485).

Therefore, according to the embodiment, an inconsistency is prevented from arising between the server address and the changed IP mode, for example, by the steps of S427 to S429 in the case where the IP mode is changed from the "Dual mode" to the IPv4 mode and thereby the IPv6 communication function is switched from ON to OFF. Also, it is prevented that inconsistency arises between the server address and the changed IP mode, for example, by the steps of S421 to S423 in the case where the IP mode is changed from the "Dual mode" to the IPv4 mode and thereby the IPv6 communication function is switched from ON to OFF.

In this embodiment, when the operation for setting the server address is conducted, the CPU 11 checks whether an inconsistency arises between the setting of the IP mode and the server address newly inputted by the user through use of the inputting device 18. Further, if the CPU 11 judges that the inconsistency does not arise between the setting of the IP mode and the inputted server address, the CPU 11 applies the setting value to the multifunction device 20 in steps S630 and S275. On the other hand, if the CPU 11 judges that the inconsistency arises between the setting of the IP mode and the inputted server address (S590: NO and S610: NO), the CPU 11 inhibits the change of the setting value (S640). Therefore, according to the embodiment, the occurrence of such inconsistency is prevented. Also, the multifunction device 20 is prevented from being modified if it will become unable to communicate with a server due to the fact that the user mistakenly inputted inappropriate setting values.

In this embodiment, if inconsistency arises between the changed IP mode and the setting of the server address, or if inconsistency arises between the changed server address and the setting of the IP mode, the CPU 11 displays the warning message indicting that the trouble will arise in the communication on the display unit 17 (S335, S365, S375, S440, S475, S595, S615). Therefore, according to the embodiment, the user notices that the user enters inappropriate setting values because the warning message is displayed. Consequently, the user can retype correct setting values.

In this embodiment, the solutions for solving the problem are displayed in the warning message box when the CPU judges that the problem will arise in the communication (S365, S375). Also, if the instruction for changing the setting is inputted by the user thorough the warning message box, the change of the setting corresponding to the solution is automatically conducted so as to correct the inappropriate change of the setting (S385, S490). Such a configuration of the embodiment allows a user not having a detailed knowledge of a network to securely control the setting of the multifunction device 20.

Although the present invention has been described in considerable detail with reference to certain preferred embodiments thereof, other embodiments are possible.

Although in the above mentioned embodiment, the judgment for judging whether the communication error arises is conducted by the management PC and the cancellation of the change of the setting is conducted by the management PC, the judgment may be conducted in the multifunction device 20 and the cancellation may also be conducted by the multifunction device 20.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

What is claimed is:

1. A management device for managing a communication device, the communication device having a first communication function for communicating using a first communication protocol and a second communication function for communicating using a second communication protocol, the management device comprising:
   an input device; and
   a processor configured to perform the following:
      receive, through the input device, a command requesting change of a communication protocol utilized by the communication device from the first communication protocol to the second communication protocol;
      before changing the communication protocol utilized by the communication device from the first communication protocol to the second communication protocol, determine whether a trouble would arise in communication involving the communication device if the communication protocol utilized by the communication device is changed from the first communication protocol to the second communication protocol;
      change the communication protocol utilized by the communication device from the first communication protocol to the second communication protocol when it is determined that the trouble would not arise in communication involving the communication device, and
      maintain the communication protocol utilized by the communication device to the first communication protocol when it is determined that the trouble would arise in communication involving the communication device.

2. The management device according to claim 1, wherein:

the processor is further configured to determine whether it is possible to maintain communication between the communication device and the management device; and the processor is further configured to determine that the trouble would arise in communication involving the communication device if the processor determines that it is not possible to maintain communication between the communication device and the management device.

3. The management device according to claim 1, wherein:

the processor is configured to change the first and second communication functions of the communication device to ON or OFF in accordance with the command received through the input device; and the processor is configured to determine whether the trouble would arise in communication involving the communication device due to the change when changing one of the first and second communication functions from ON to OFF.

4. The management device according to claim 3, the processor further configured to record, in a storage unit, log information regarding a protocol of at least one device which communicated with the communication device through a network in a past predetermined time period, wherein the processor is further configured to, based on the log information, determine whether a device, which will become unable to communicate with the communication device, exists in the at least one device recorded in the log information due to the change; and the processor is configured to determine that the trouble would arise if it is determined that the device, which will become unable to communicate with the communication device, exists in the at least one device recorded in the log information.

5. The management device according to claim 1, the processor further configured to cause display of a message indicating that the trouble would arise in communication involving the communication device, if the processor determines that the trouble would arise.

6. The management device according to claim 1, wherein the processor is further configured to:

derive a solution for the trouble if the processor determines that the trouble would arise in communication involving the communication device; and display the solution.

7. The management device according to claim 1, wherein the processor is further configured to:

derive a solution for the trouble if the processor determines that the trouble would arise in communication involving the communication device; and alter the operation of the communication device in accordance with the solution.

8. A management device for managing a communication device executing communication with a network device through a network using a predetermined communication setting, the management device comprising:

an input device; and a processor, when executing instructions, configured to:

receive, through the input device, a command requesting change of a communication protocol utilized by the communication device from a currently utilized communication protocol to an alternative communication protocol;

before applying the change to the communication protocol utilized by the communication device from the currently utilized communication protocol to the alternative communication protocol, determine whether a communication trouble would arise if the alternative communication protocol is utilized by the communication device instead of the currently communication protocol;

change the communication protocol to the alternative communication protocol when it is determined that the communication trouble would not arise; and maintain the currently utilized communication protocol when it is determined that the communication trouble would arise.

9. A computer usable storage device having a computer program stored thereon, which, when executed by a processor of a management device having a first communication function for communicating using a first communication protocol and a second communication function for communicating using a second communication protocol, configures the processor to perform the following:

receive a command requesting change of a communication protocol utilized by the communication device from the first communication protocol to the second communication protocol; and before changing the communication protocol used by the communication device from the first communication protocol to the second communication protocol, determine whether a trouble would arise in communication involving the communication device if the communication protocol utilized by the communication device is changed from the first communication protocol to the second communication protocol, change the communication protocol utilized by the communication device from the first communication protocol to the second communication protocol when it is determined that the trouble would not arise in communication involving the communication device, and maintain the communication protocol utilized by the communication device when it is determined that the trouble would arise in communication involving the communication device.

\* \* \* \* \*